United States Patent [19]
Whitney

[11] Patent Number: 6,029,312
[45] Date of Patent: Feb. 29, 2000

[54] ORGANIC MATERIAL COLLECTION AND TRANSPORT DEVICE

[75] Inventor: James C. Whitney, Norwalk, Conn.

[73] Assignee: Woodland Power Products, Inc., West Haven, Conn.

[21] Appl. No.: 08/984,335

[22] Filed: Dec. 3, 1997

[51] Int. Cl.[7] .................................................. A01D 34/12
[52] U.S. Cl. ................................ 15/347; 56/202; 56/205
[58] Field of Search ......................... 15/347, 352, 340.1; 56/202, 203, 205, 16.6; 280/460.1, 415.1; 220/4.28, 6

[56] References Cited

U.S. PATENT DOCUMENTS

| | | | |
|---|---|---|---|
| 3,732,675 | 5/1973 | Armstrong | 56/202 |
| 3,984,893 | 10/1976 | Ashley | 15/339 |
| 4,126,986 | 11/1978 | Kidd | 56/202 |
| 4,699,393 | 10/1987 | Schweigert . | |
| 4,761,943 | 8/1988 | Parker et al. | 56/202 |
| 4,770,440 | 9/1988 | Lander | 280/760 |
| 4,787,197 | 11/1988 | Schweigert . | |
| 4,922,696 | 5/1990 | Burns et al. | 56/202 |
| 4,968,053 | 11/1990 | Schweigert . | |
| 5,010,620 | 4/1991 | Young | 15/347 |
| 5,070,687 | 12/1991 | Schweigert . | |
| 5,085,451 | 2/1992 | Schweigert . | |
| 5,218,737 | 6/1993 | Dansby et al. | 15/347 |
| 5,291,722 | 3/1994 | Schweigert | 56/203 |
| 5,317,783 | 6/1994 | Williamson | 15/346 |
| 5,630,247 | 5/1997 | Venia | 15/347 |

OTHER PUBLICATIONS

Trac Vac Residential Lawn Care Equipment Brochure (6 pages) No Date Available.
EasyVac™ Lawn Vacuums/EasyRake™ Powered Lawn Tools Brochure (6 pages) No Date Available.

*Primary Examiner*—Robert J. Warden, Sr.
*Assistant Examiner*—Andrew Aldag
*Attorney, Agent, or Firm*—Ware Fressola Van Der Sluys & Adolphson LLP

[57] ABSTRACT

A device for collecting and transporting organic material comprises a trailer chassis, collector frame, and collector bag. The trailer chassis has a double tongued hitch for connecting to a tractor and for preventing jackknifing. The collector frame can be folded so as to occupy minimum space when the device is not in use. The collector frame is hingedly connected to the trailer chassis so that the collector bag can be dumped by rotating the collector frame about the hinges. The collector frame is removable from the trailer chassis to make storage easy. The collector bag is constructed preferably from non-breathable fabric and has an exhaust vent in the top of the collector bag.

22 Claims, 23 Drawing Sheets

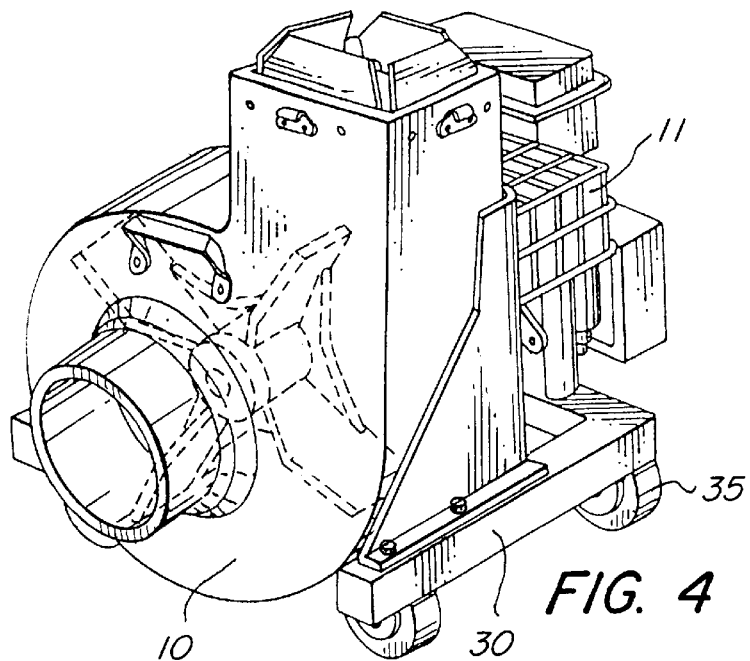
FIG. 4
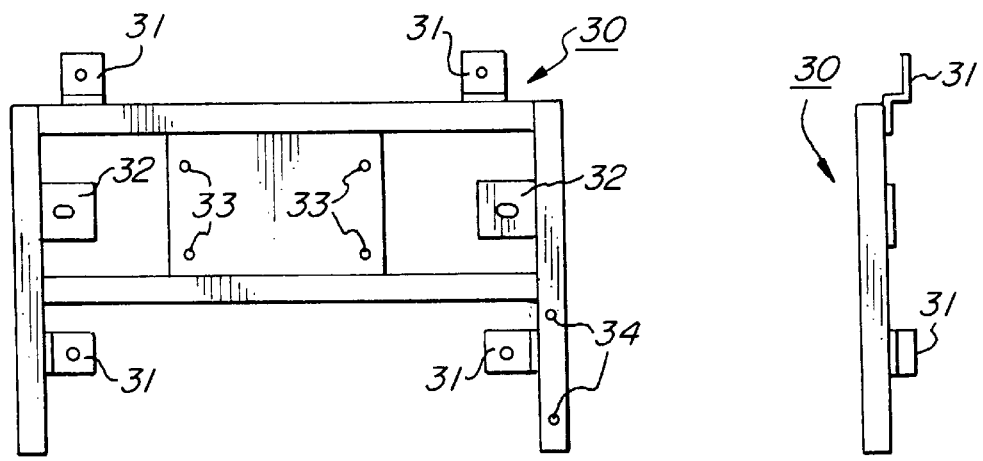
FIG. 10A
FIG. 10B
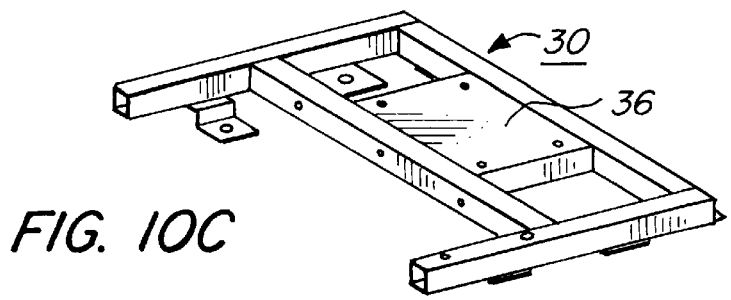
FIG. 10C

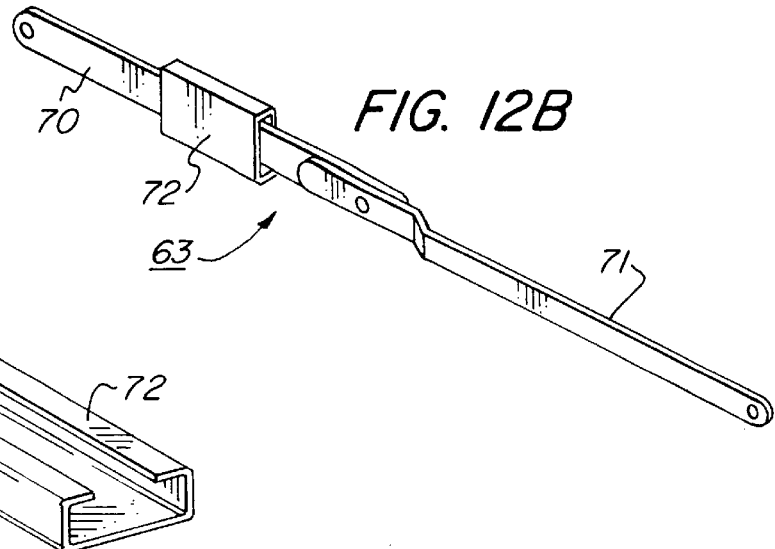
FIG. 12B
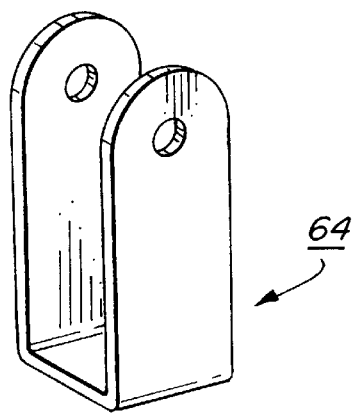
FIG. 12C
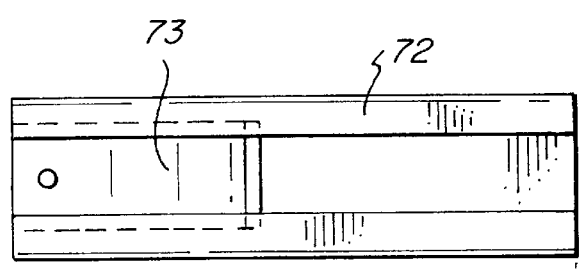
FIG. 12D
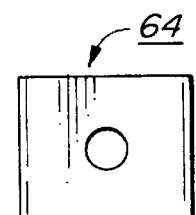
FIG. 12E
FIG. 12H
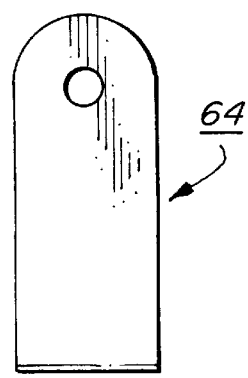
FIG. 12G
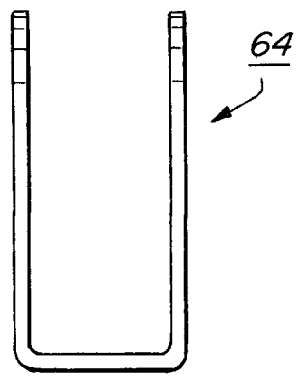
FIG. 12F

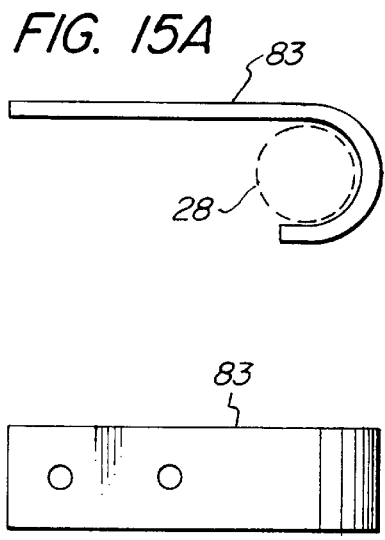
FIG. 15A
FIG. 15B
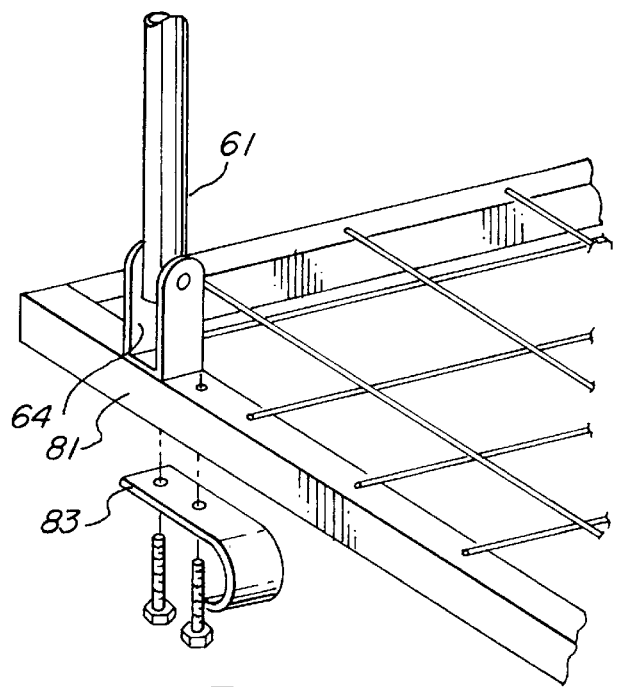
FIG. 15C
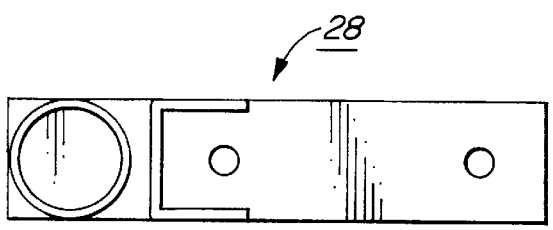
FIG. 17A
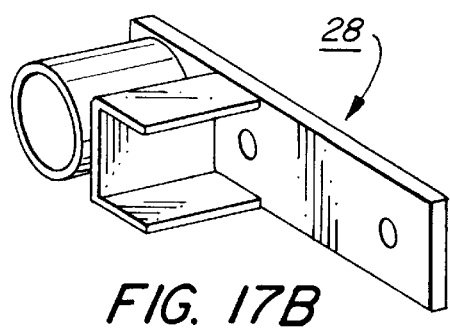
FIG. 17B
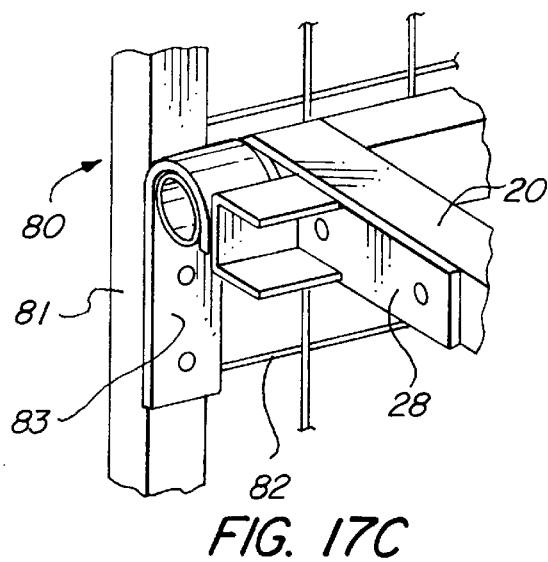
FIG. 17C

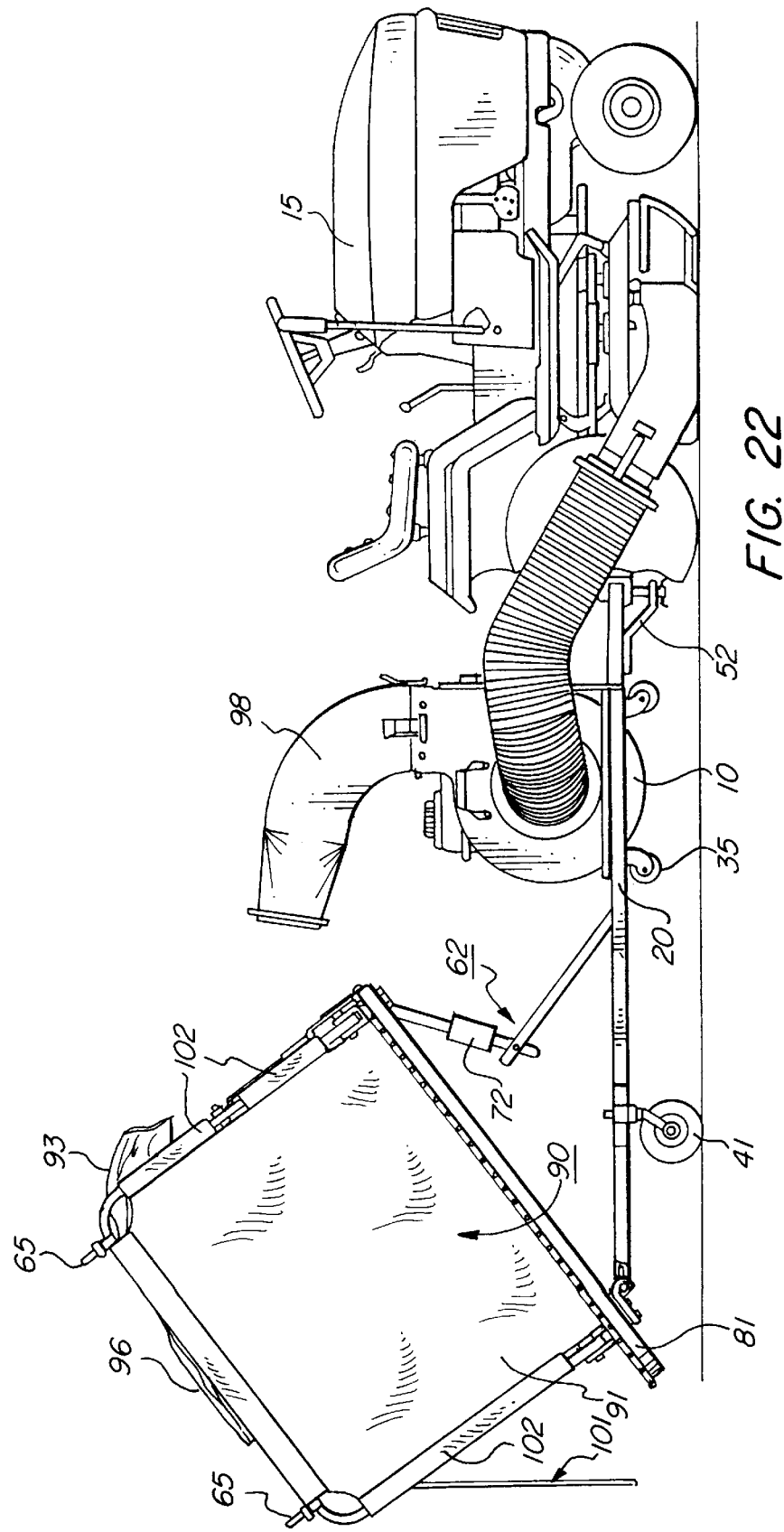

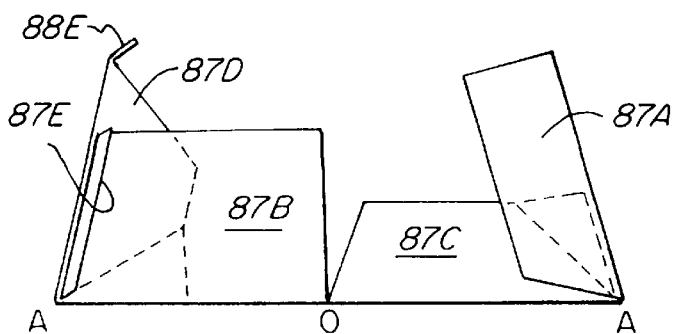
FIG. 23G
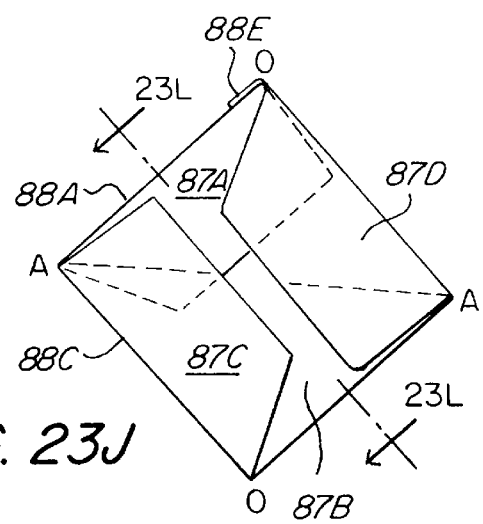
FIG. 23J
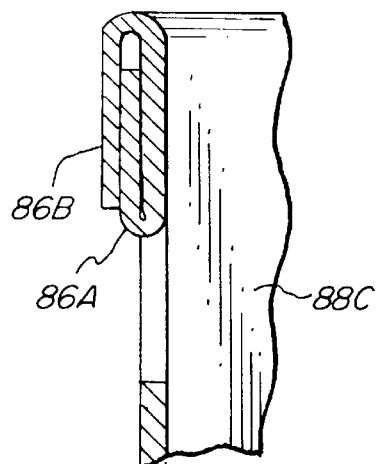
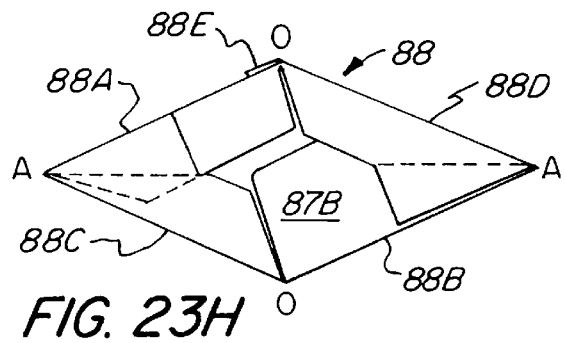
FIG. 23H
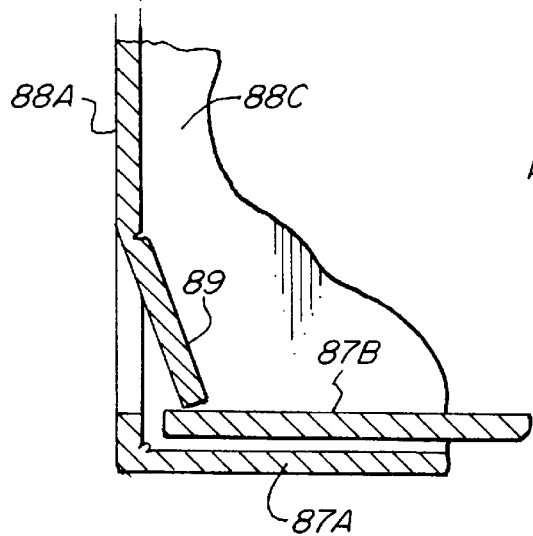
FIG. 23L
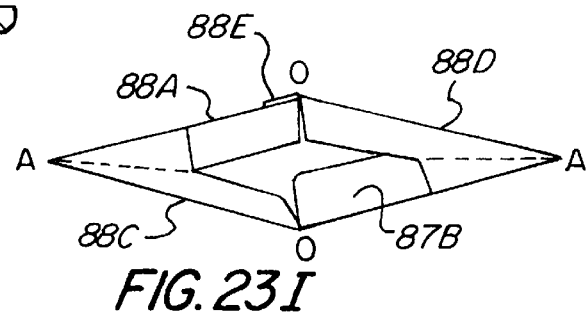
FIG. 23I

ORGANIC MATERIAL COLLECTION AND TRANSPORT DEVICE

BACKGROUND OF THE INVENTION

1. Field of the Invention

The present invention relates generally to devices for collecting and transporting leaves, cut grass, small sticks, pine needles, wood chips, nuts, and other material (hereinafter referred to as "organic material") and in particular, to such trailer-mounted devices which are pulled by a tractor, and are commonly called "trail vacs".

2. Description of the Prior Art

In the prior art, organic material is often collected from an area by a device which comprises a tractor, trailer, fan motor, fan, fan housing, inlet duct, outlet duct, and collector receptacle. The fan is disposed within the fan housing and is rotated by the fan motor. The fan housing, fan motor, and receptacle are attached to and supported by the trailer. In order to move the device to different locations, the trailer is pulled by a tractor via a standard ball and socket trailer hitch or pin joint.

The prior art devices are further assembled such that the entrance of the inlet duct is positioned near the organic material, and the other end of the inlet duct is connected to the low pressure side of the fan housing (the "organic material collecting inlet"). The outlet duct is connected between the high pressure side of the fan housing, (the "outlet stream portal"), and the receptacle.

When the fan motor is turned on, the fan generates a vacuum in the inlet duct which sucks air and organic material into the inlet duct. The air and organic material pass through the fan housing and into the outlet duct where the air and organic material are blown by the fan into the receptacle.

The prior art devices have many disadvantages. They are usually constructed primarily from steel which makes them heavy, difficult to store, and difficult to transport. In addition, the prior art devices are prone to jackknifing making them difficult to maneuver, especially when backing up. Finally, the prior art devices are permanently assembled and rigidly constructed, and they therefore occupy a large amount of storage space when not being used.

SUMMARY OF THE INVENTION

Accordingly it is an object of the present invention to provide a lightweight device for collecting and transporting organic material which can be readily disassembled and conveniently stored in less space than that occupied by the device when in use.

It is also an object of the present invention to provide a device for collecting and transporting organic material which avoids jackknifing when backing.

It is another object of the present invention to provide convenient means for bagging organic material for disposal.

Another object of the present invention is to provide a convenient means for dumping the organic material in a desired location.

It is yet another object of the present invention to provide a means for placing organic material in a location where it would be inconvenient for the tractor to travel.

The foregoing objectives are realized by the present invention which generally comprises a trailer chassis with two tongues for attaching to a tractor, a detachable and collapsible collector frame, a detachable and collapsible collector bag, and a removable motor assembly.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include the following:

FIG. 4, a perspective view of the fan/motor mount, fan housing, and motor;

FIGS. 10A, 10B and 10C, top, side and perspective views respectively of the fan/motor mount;

FIG. 12B, a perspective view of a collector side tube strut-linkage;

FIG. 12C and 12D, perspective and top views respectively of the strut-linkage slider;

FIG. 12E, 12F, 12G, and 12H, top, front, side and perspective views respectively of the side tube hinge bracket;

FIG. 15A, 15B and 15C, front, bottom and perspective views respectively of the collector base J-bracket;

FIG. 17A, 17B and 17C are a side and two perspective views respectively of the collector base hinge bracket;

FIG. 22, a side view of the device according to the present invention shown in the process of being raised to the dumping position;

FIG. 23G is a top view and 23H, I, and J are successive diagrammatic bottom views of the stages of fabrication of a collector bin 88 from the blank shown in FIG. 23E; FIG. 23K is a front corner perspective view and FIG. 23L is a fragmentary enlarged cross-sectional elevation view of bin 88, taken along plane 23L—23L in FIG. 23J.

DETAILED DESCRIPTION OF THE INVENTION

Figure 1:
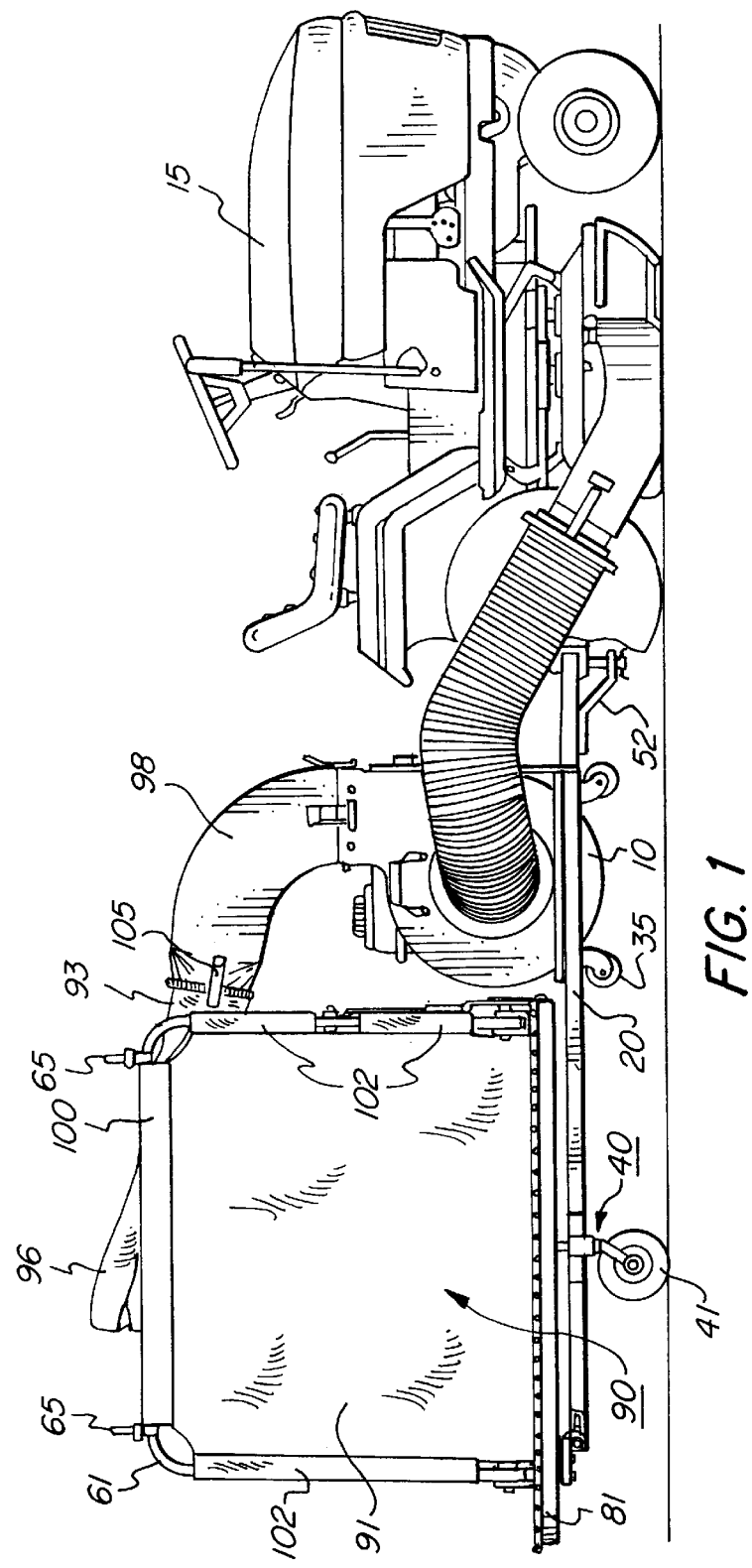
FIG. 1, a side view of the assembled device of the present invention connected to a tractor.

The present invention may be used to collect and transport organic material. Turning now to the drawings, in FIG. 1 there is shown an embodiment of the present invention connected to a tractor 15 ready to collect organic material. FIGS. 2 and 3 show the trailer chassis 20, one of two swivelling wheel fork assemblies 40 with a wheel 41 attached, and two tongues 50. The trailer chassis 20 is shown in more detail in FIGS. 5 and 6, the fork assembly 40 is shown in more detail in FIGS. 7A, 7B, and 7C, and the tongue 50 is shown in more detail in FIGS. 8A, 8B, 8C and 8D.

Figure 5:
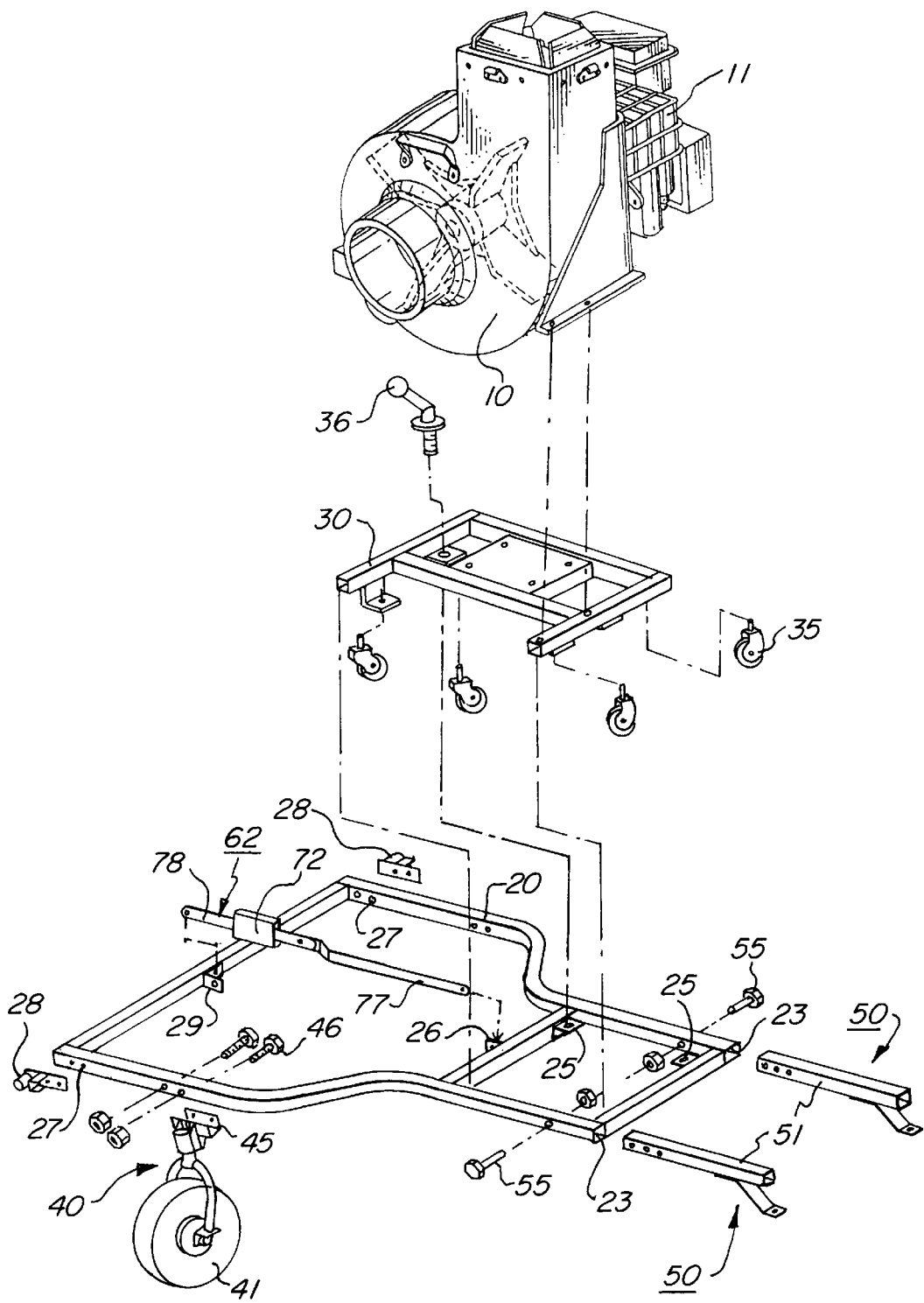
FIG. 5, an exploded perspective view of the trailer chassis, one of two swiveling wheel fork assemblies, two tongues, dump linkage, two collector base hinge brackets, fan/motor mount, casters, motor, and fan housing.
Figure 6:
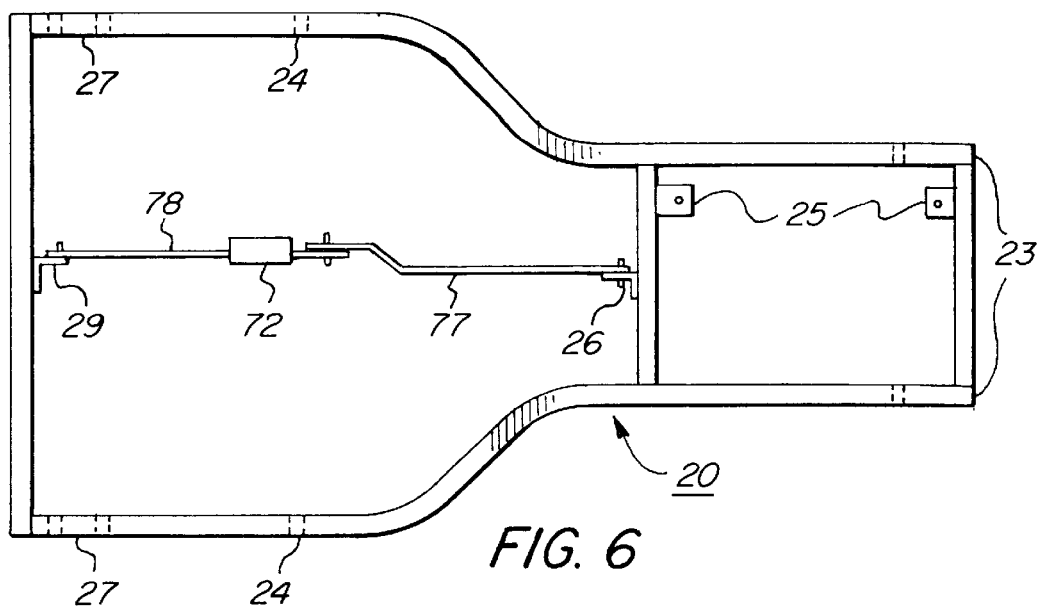
FIG. 6, a top view of the trailer chassis with the dump linkage in the stored position.
Figure 7A:
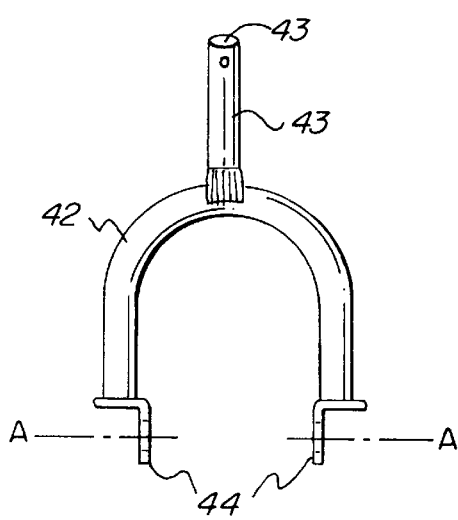
FIGS. 7A, 7B, and 7C, front, side, and perspective views respectively of the swiveling wheel fork assembly without the wheel.
Figure 7B:
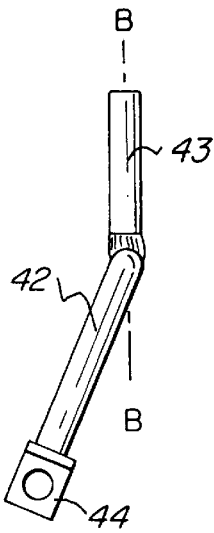
Figure 7C:
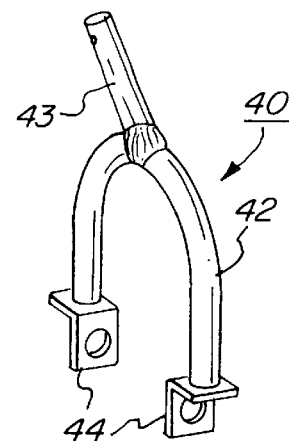

As shown in FIGS. 5 and 6, the trailer chassis 20 is a tubular frame comprised of two tongue connection points 23, two wheel fork connection points 24, two vacuum assembly tabs 25, dump strut tab 26, dump linkage storage bracket 29 and hinge connection points 27. As will be described below, the trailer chassis 20 serves as the support structure for the collector frame 60 (shown in FIG. 11), the fan/motor mount 30 (shown in FIGS. 4 and 5) on which is mounted the motor 11, and the fan housing 10, and serves as the connection point for the two wheel fork assemblies 40 (shown in FIGS. 7A, 7B and 7C).

Figure 7D:
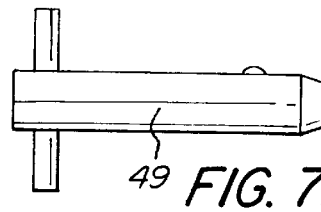
FIG. 7D, a front view of the ball-detent snap pin used with the wheel fork assembly.
Figure 9A:
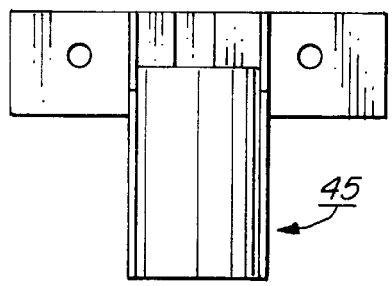
FIGS. 9A, 9B, 9C, and 9D, front, side, bottom and perspective views respectively of the castor stem bearing housing.
Figure 9B:
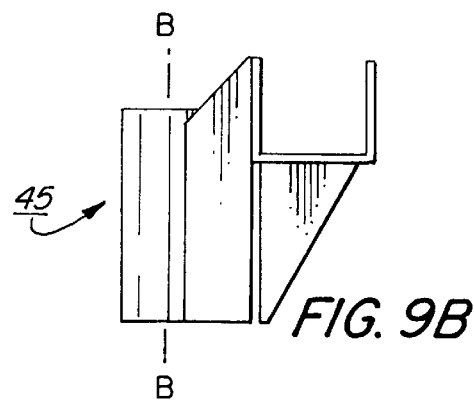
Figure 9C:
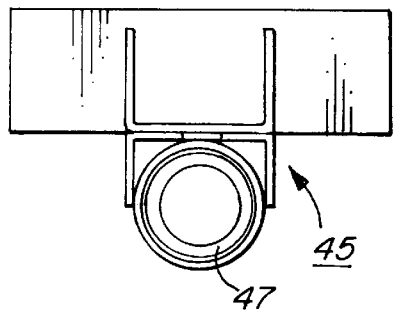
Figure 9D:
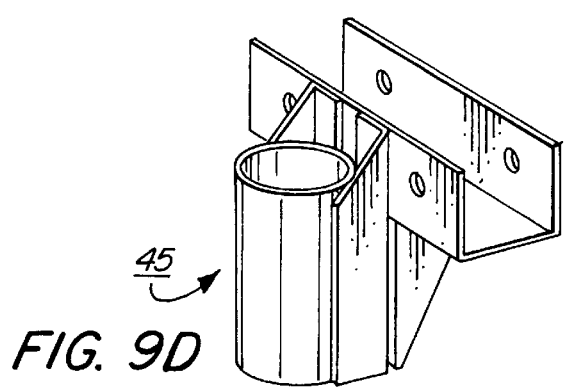

As shown in FIGS. 1, 2, 5, 7A–7C and 9A–9D, the wheel fork assembly 40 is comprised of U-tube 42, vertical swivel post extender 43, castor stem bearing housings 44, and fork bracket 45 (shown in detail in FIGS. 9A–9D). The U-tube 42 is anchored to the vertical extender 43 and to the castor stem bearing housings 44 by welding. The vertical extender 43 is disengageably connected to the fork bracket 45 by a ball-detent snap pin 49 (shown in FIG. 7D), and the fork bracket 45 is secured to the trailer chassis 20 by bolts 46 (FIG. 5). Rotation of the wheel fork assembly 40 about axis B—B (shown in FIG. 7B) is accommodated by bearings 47 (shown in FIG. 9C). Each fork assembly 40 is designed to support a wheel 41 shown in FIGS. 1 and 5. It should be noted that the fork assembly 40 permits rotation of the wheel 41 about the axis A—A (shown in FIG. 7A) and also permits rotation of U-tube 42 about the axis B—B (shown in FIG. 7B).

Figures 8A, 8B:
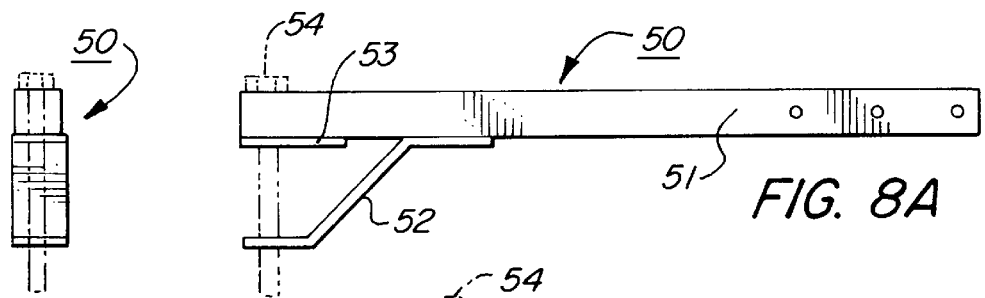
FIGS. 8A, 8B, and 8C, front, side, and perspective views respectively of a hitch tongue.
Figure 8C:
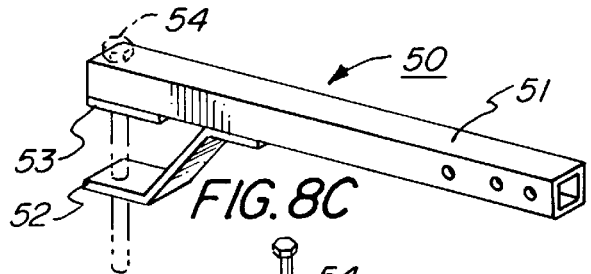
Figure 8D:
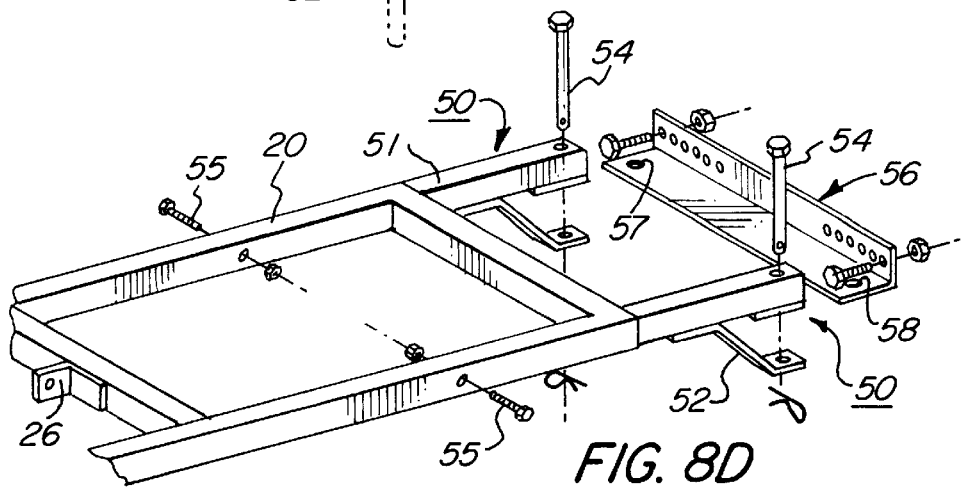
FIG. 8D, a fragmentary exploded view of the hitch tongues and tractor hitch bracket.

As shown in FIGS. 8A–8D, each tongue 50 is comprised of tubular horizontal extender 51, angle bracket 52, and straight bracket 53. The tongues 50 connect the tractor 15 to the trailer chassis 20. Both the angle bracket 52 and straight bracket 53 are welded to the horizontal extender 51. The horizontal extender 51 is connected to the trailer chassis 20 by bolts 55 (FIGS. 5 and 8D). As shown in FIGS. 3 and 8D, both tongues 50 are connected to the tractor by tractor hitch bracket 56 in conjunction with pins 54 (shown in FIGS. 2 and 8D) which extend through the angle bracket 52 and straight bracket 53. Tractor hitch bracket 56 has therethrough oversized holes 57, 58 for receiving the pins 54. By making the holes 57, 58 oversized relative to the diameter of pin 54, the trailer chassis 20 is permitted a limited degree of rolling motion with respect to the tractor 15 in order to move over ground which is not level and keep the wheels 41 on the ground. Furthermore, the tractor hitch bracket 56 permits the trailer chassis 20 a limited degree of pitch with respect to the tractor 15. However, due to the two points of connection to tractor hitch bracket 56, the yaw of the trailer chassis 20 with respect to the tractor 15 is severely restricted. By supplying two tongues 50 and swivelling wheels 41, trailer jackknifing is eliminated, and therefore, the device is easier to maneuver, especially when backing up and when turning sharply.

As shown in FIGS. 10A–10C, there is shown the tubular fan/motor mount 30 which provides support for the motor 11 shown in FIGS. 2, 3 and 4 and fan housing 10, and provides anchoring connection points for both the motor 11 and fan housing 10. The fan/motor mount 30 is comprised of caster tabs 31 and chassis tabs 32. The fan/motor mount 30 has therethrough motor mounting holes 33 formed in a motor support plate 36, and fan mounting holes 34. The motor mounting holes 33 and fan mounting holes 34 permit mounting the motor 11 and the fan housing 10 respectively to the fan/motor mount 30 via bolts (not shown). The caster tabs 31 permit connection of the casters 35 shown in FIGS. 1, 4 and 5 to the fan/motor mount 30 so that the motor 11, fan housing 10, and fan/motor mount 30 can be rolled on the casters when not connected to the trailer chassis 20. The chassis tabs 32 permit removable connection of the fan/motor mount 30 to the vacuum assembly tabs 25 of trailer chassis 20 (shown in FIG. 6) without tools via handled bolts 36 (shown in FIGS. 2 and 5). In this manner, the fan/motor mount 30, fan housing 10, and motor 11 can be easily removed from the trailer chassis 20, and rolled on the casters 35 to a convenient storage location.

Figure 11:
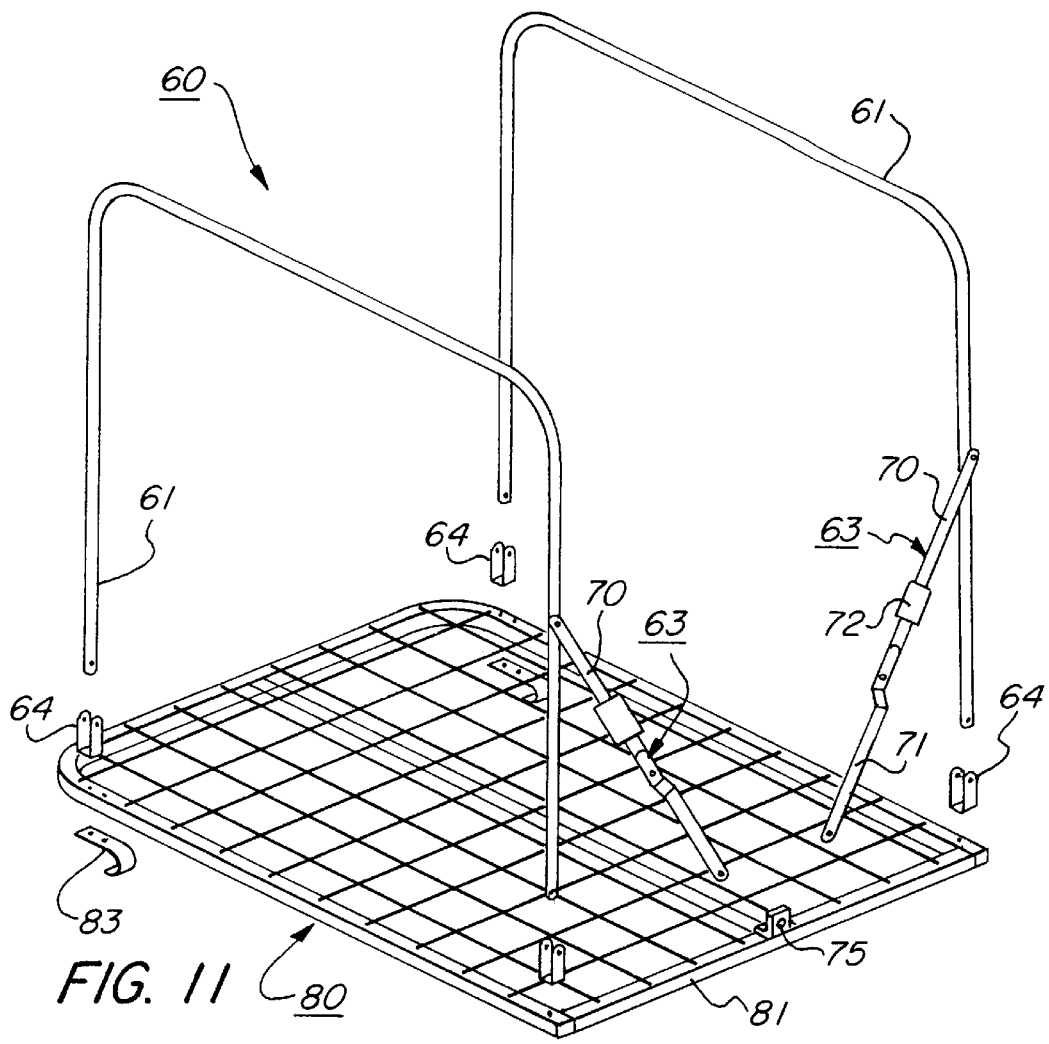
FIG. 11, an exploded perspective view of the collector frame.
Figure 12A:
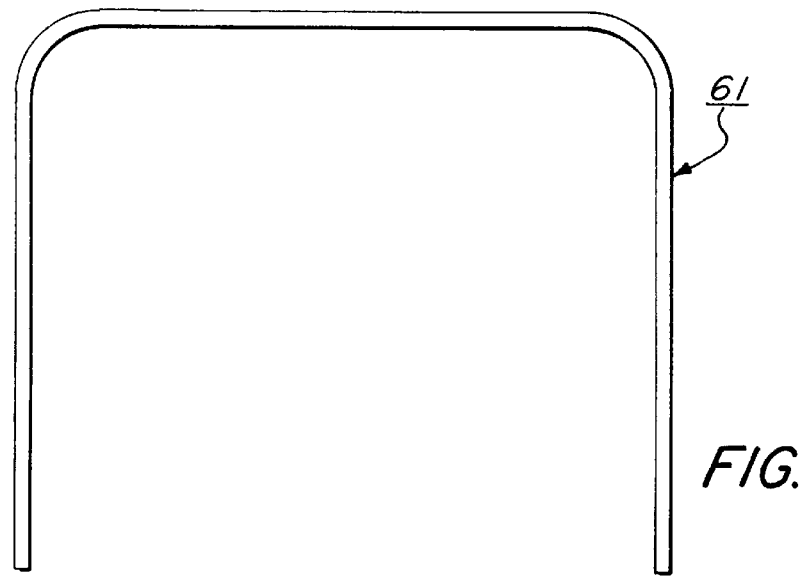
FIG. 12A, a front view of a collector side tube.
Figure 13A:
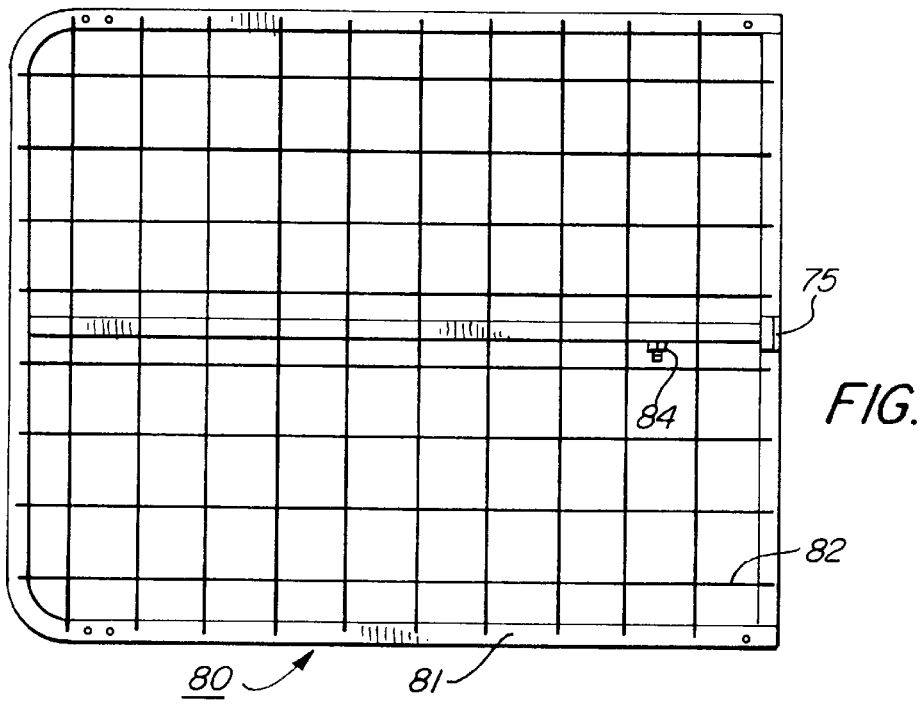
FIG. 13A, a top view of the collector base.
Figure 13B:
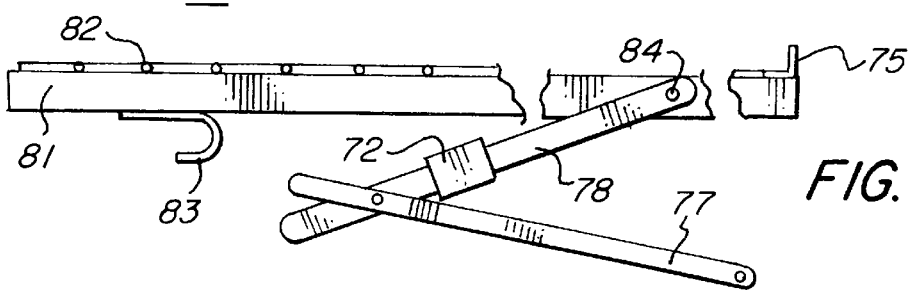
FIG. 13B, a fragmentary side view of the collector base and dump linkge.
Figure 14:
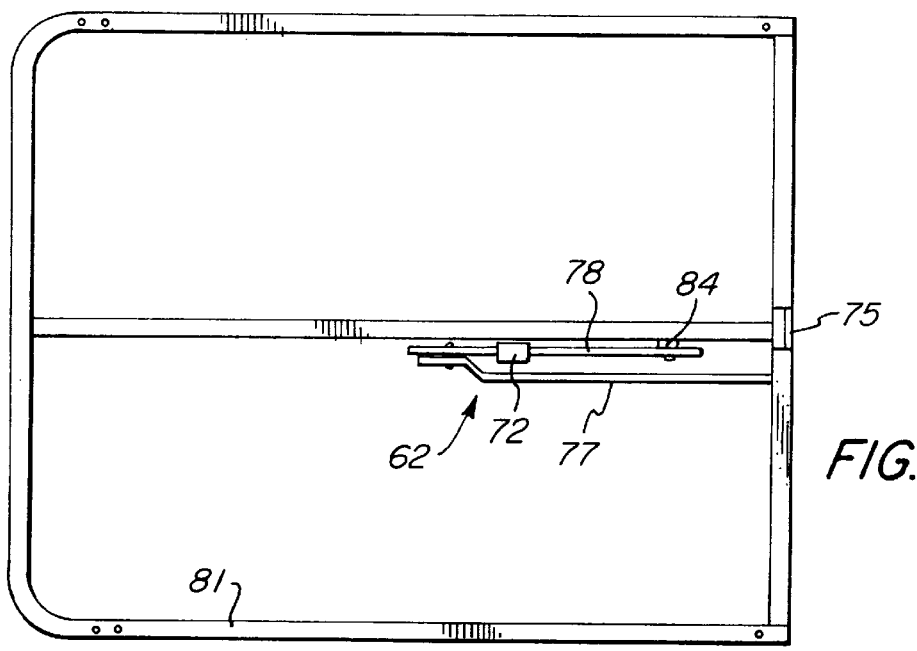
FIG. 14, a top view of the collector base frame without the collector base mesh.

In FIG. 11 there is shown the collector frame 60 comprising inverted u-shaped side tubes 61, collapsible side tube strut-lankges 63, and side tube hinge brackets 64, which are bolted to collector base 80. The lower free ends of both side tubes 61 are pivotingly bolted in hinge brackets 64 for angular movement from the deployed upright position shown in FIGS. 1, 2 and 3 to a down-folded position, retracted against base 80, for compact storage, as shown in FIGS. 25–28. The collector frame 60 can thus be collapsed for easy storage and as described later, the collector frame supports a collapsible collector bag 90. A side tube 61 is shown in more detail in FIG. 12A and a side tube strut-linkage is shown in more detail in FIG. 12B. As shown in FIGS. 13A and 13B, the collector base 80 is comprised of the tubular collector base frame 81, welded rod collector base mesh 82 peripherally welded thereto, and collector base J-brackets 83 bolted with hinge brackets 64 to the rear corners of collector base frame 81. The collector base frame 81 is shown in more detail in FIG. 14. A J-bracket 83 is shown in more detail in FIGS. 15A–15C. One end of each side tube strut-linkage 63, both collector base J-brackets 83, and all four side tube hinge brackets 64 (shown in detail in FIGS. 12E–12H) are connected to the collector base frame 81 via suitable bolts (not shown). Each end of the side tube strut-linkages 63 which is not connected to the collector base 80 is connected to the side tubes 61 via suitable bolts (not shown).

Figure 25:
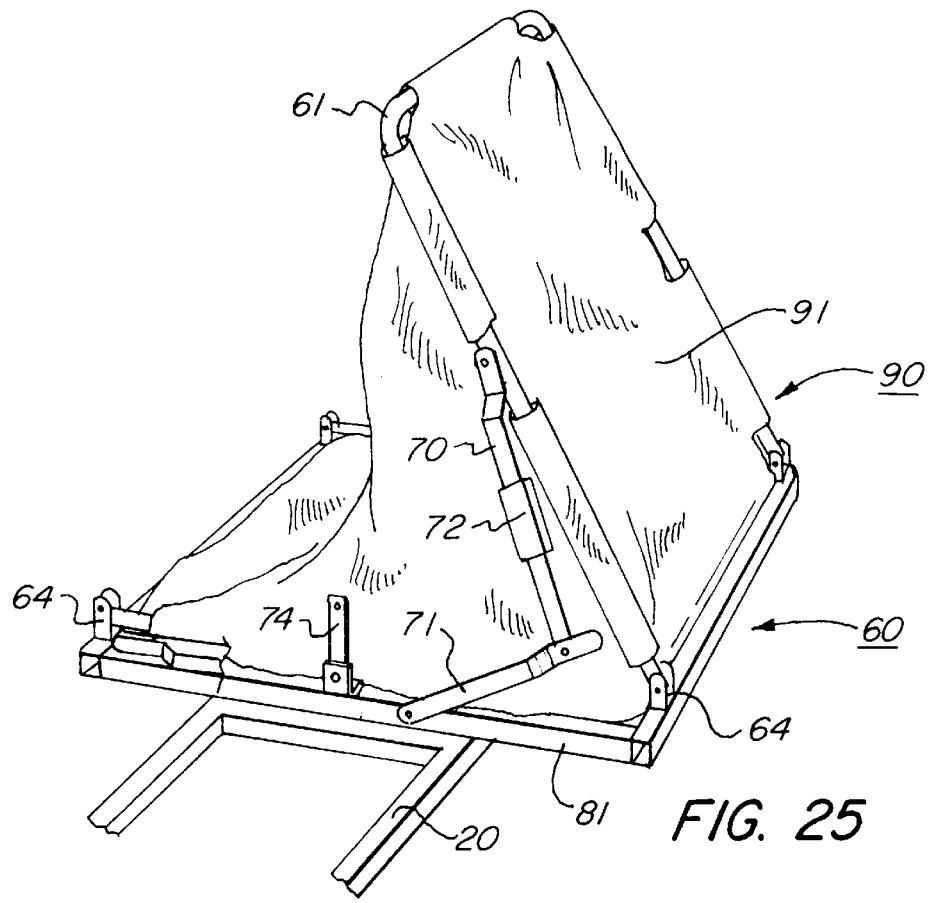
FIGS. 25 and 26 are perspective views of the collector frame 60 and collector bag 90 in the process of collapsing.
Figure 26:
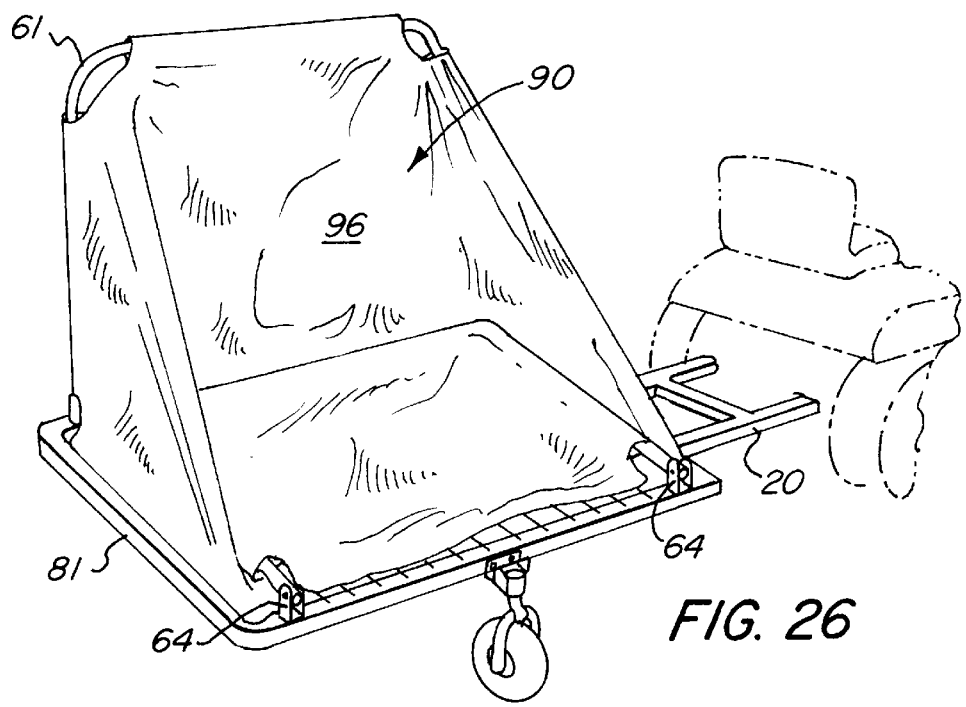
Figure 27:
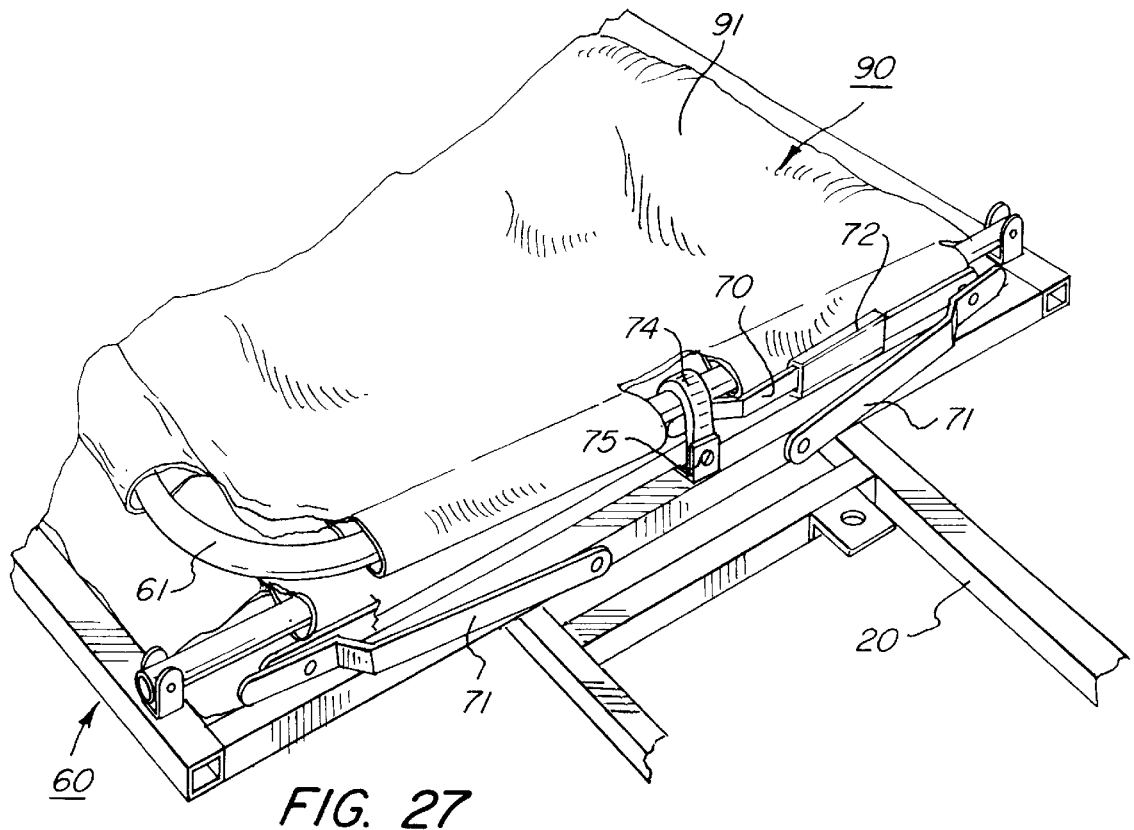
FIGS. 27 and 28 are perspective views of the collector frame 60 and collector bag 90 in the fully collapsed state.
Figure 28:
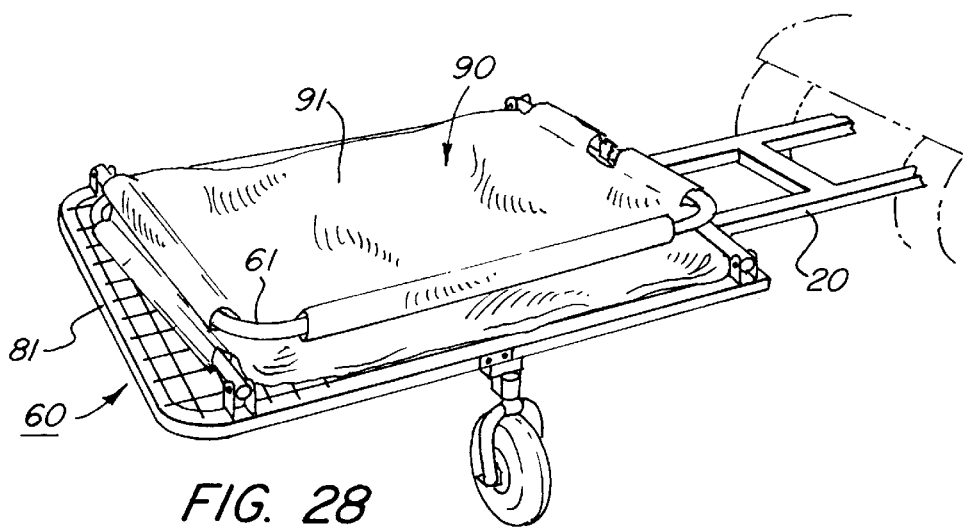
Figure 32:
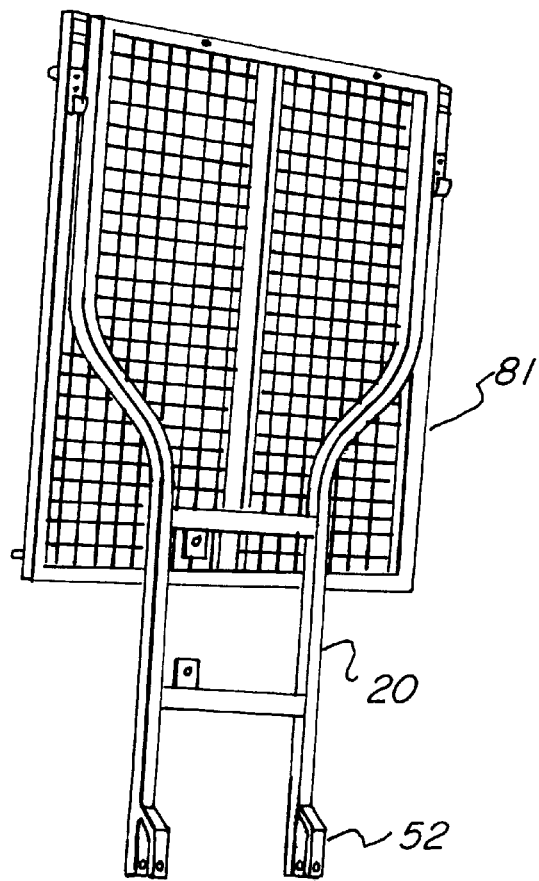
FIG. 32 is a perspective view of the collector frame and collector bag hanging on a wall.

When in use, the side tubes 61 are held relative to the collector base 80 in the position shown in FIG. 11 by the side tube strut-linkages 63, and if provided, the removable carrier bars 65 (shown in FIGS. 1, 2, 3 and 19). When it is desired to store the collector frame 60, the carrier bars 65 are removed and it will be noticed from FIGS. 11, 12B, and 25 that the upper side tube link 70 of each collapsible strut-linkage 63 is hingedly connected to the lower side tube link 71, and that by raising the strut-linkage slider 72, the side tube strut-linkage 63 can be urged to collapse, which permits the side tubes 61 to rotate about the side tube hinge brackets 64 toward each other and toward the collector base 80. In this manner, the side tubes 61 are folded with collapsible collector bag 90 onto the collector base 80, thereby occupying minimum storage space. It should be noticed that the strut-linkage sliders 72 are equipped with a leaf spring 73 (shown in FIG. 12C and 12D) which holds the strut-linkage slider 72 in the position desired by the user while the collector frame 60 is collapsed. FIGS. 25 and 26 show the collector frame 60 and collector bag 90 in the process of collapsing. FIGS. 27 and 28 show the collector frame 60 and collector bag 90 in the fully collapsed state. In order to keep the side tubes 61 against the collector base frame 81, the elastic strap 74 (shown in FIG. 25) is bolted at one end to the elastic strap tab 75 (shown in FIG. 11), and the elastic strap 74 fits around a bolt which holds an upper side tube link 70 to a side tube 61. FIG. 32 is a perspective view of the collector frame 60 and collector bag 90 hanging on a wall to illustrate that the collector frame 60 and collector bag 90 are lightweight and occupy minimal space when stored.

As shown in FIGS. 5 and 16A–16F, the dump linkage 62 is comprised of chassis dump link 77, collector dump link 78, and strut-linkage slider 72. When the collector base 80 is rotated into the dump position (FIG. 16I), the dump linkage 62 holds the collector base 80 in the dump position until the strut-linkage slider 72 is moved away from the chassis dump link 77. Strut-linkage slider 72 is slidingly disposed about collector dump link 78. When ready for dumping, one end of collector dump link 78 is connected to the collector base frame 81 via collector dump link pin 84 (shown in FIG. 14) and a bridge pin or cotter pin (not shown), and the other end of collector dump link 78 is hingedly connected to chassis dump link 77. The other end of chassis dump link 77 is pivotally connected to the trailer chassis 20 at dump strut tab 26 (shown in FIG. 6) via a nut and a bolt. Alternatively, during disassembly for storage, the collector dump link 78 is connected to the trailer chassis 20 at the dump linkage storage bracket 29 (FIG. 6) via a bridge pin or cotter pin (not shown) instead of to dump link pin 84. The dump linkage storage bracket 29 is shown in FIGS. 16E–16H. It should be noticed that the strut-linkage slider 72 (shown in FIGS. 12C and 12D) is equipped with a leaf spring 73 which holds the strut-linkage slider 72 in the position desired by the user while the collector base is being raised toward or lowered from the dump position (FIG. 22).

Figure 16A:
FIG. 16A and 16B, side and front views respectively of the chassis dump link.
Figure 16B:
Figure 16E:
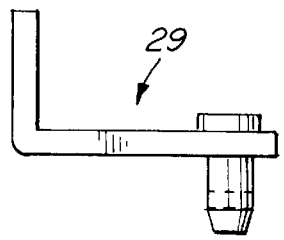
FIG. 16E, 16F, 16G and 16H, top, front, side and perspective views of the dump linkage storage bracket.
Figure 16C:
FIG. 16C, a front view of the collector dump link.
Figure 16F:
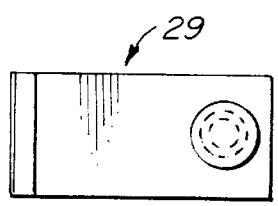
Figure 16D:
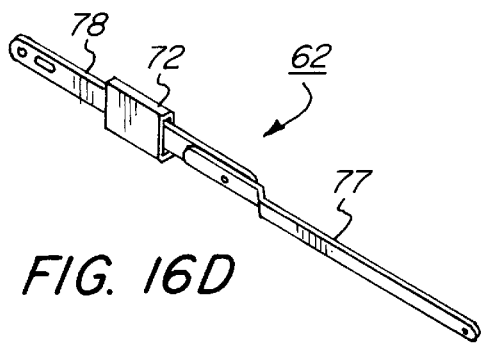
FIG. 16D, a perspective view of the dump linkage.
Figure 16G:
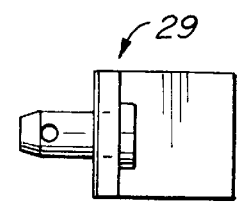
Figure 16I:
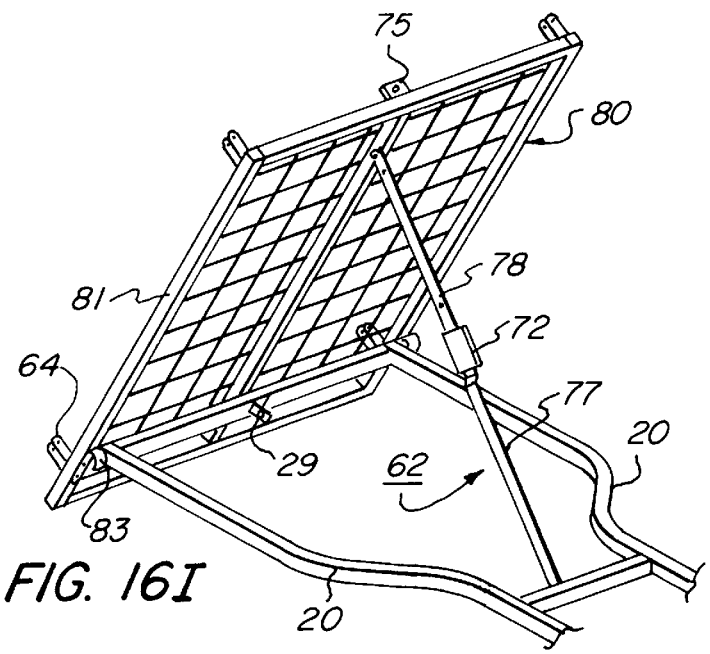
FIG. 16I, a perspective view of the collector base in the dumping position and part of the trailer chassis.
Figure 16H:
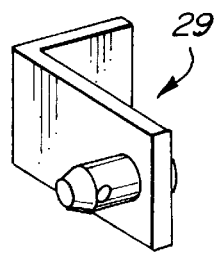

Connected to the rear corners of the trailer chassis 20 at the hinge connection points 27 (shown in FIG. 5) are the collector base hinge blocks 28 (shown in FIGS. 5, 17A–17C). The collector base hinge blocks 28 engaged with the J-brackets 83 permit the collector base 80 to rotate upward (FIGS. 16I, 19, 22) so as to dump the organic material from the collector bag 90 (described below). When it is desired to dump organic material from the collector bag 90, the rear wall zipper 99 (shown in FIG. 21) is unzipped, and the collector base 80 is pivoted about the collector base hinge blocks 28 until the dump linkage 62 is fully extended as shown in FIG. 16I. When the dump linkage 62 is fully extended, the strut-linkage slider 72 may be positioned over the area where the chassis dump linkage 77 and collector dump link 78 are hingedly connected in order to maintain the dump linkage 62 in the fully extended position.

If the dump linkage 62 is disconnected from the collector dump link pin 84 and the collector base 80 is rotated about the collector base hinge blocks 28 so that the collector base 80 is nearly perpendicular to the trailer chassis 20 (FIG. 17C), the collector base hinge blocks 28 and collector base J-brackets 83 permit lifting upward removal of the collector base 80 from the trailer chassis 20. In this manner, the collector frame 60 can be stored separately from the trailer chassis 20. Furthermore, since the side tubes 61 and collapsible collector bag 90 can be folded onto the collector base 80, the collector frame 60 and collector bag 90 can be conveniently stored in much less space than that occupied by the collector bag 90 and collector frame 60 when in use.

Figure 18:
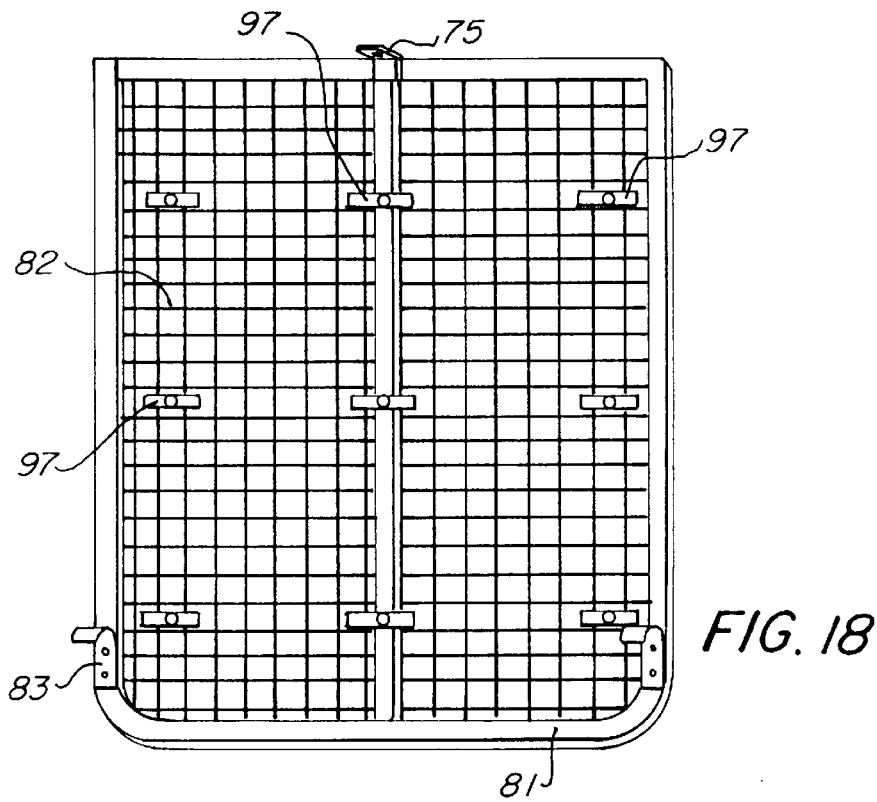
FIG. 18, a bottom view of the collector base showing the base straps.
Figure 19:
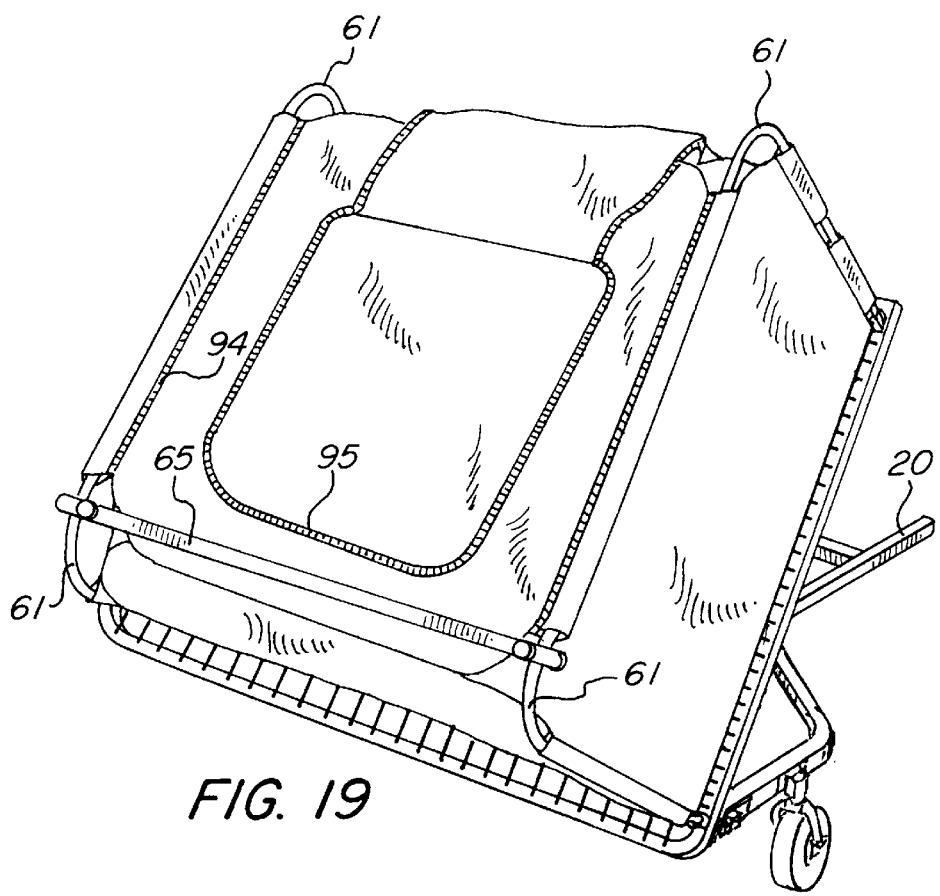
FIG. 19, a perspective view of the collector bag and collector frame in the dumping position viewed from the rear.

Mounted on the collector base 80 and the side tubes 61, is the collector bag 90 shown in FIGS. 1, 2, 3 and 22. In a preferred embodiment, the collector bag 90 is comprised substantially of non-breathable fabric panels 91. On the top panel of the collector bag 90 (the panel opposite the bottom panel, which contacts the collector base 80) is a mesh vent 92 (FIG. 3) for allowing air to escape from the collector bag 90. Positioned over the mesh vent 92 is a hood 96 open to the rear, for directing escaping air away from the tractor 15. On the front panel of the collector bag 90 (the panel closest to the fan housing 10), is an angled inlet port 93 (FIGS. 1, 2, 20 and 22). The base straps 97 (shown in FIG. 18) removably attach the bottom panel of the collector bag 90 to the welded rod mesh 82 of collector base 80. The rear wall zipper 99 (shown in FIG. 21) and the top flap zipper 95 permit the collector bag 90 to be opened and emptied. Although the collector bag 90 has been described herein as comprising zippers, other means besides zippers may be used (e.g. velcro).

The side tube zippers 94 and tubular support flaps 100, extending along both side edges of the top panel of collector bag 90, removably attach the collector bag 90 to the side tubes 61. In order to install the collector bag 90 on the side tubes 61, the side tubes 61 are slid into the vertical flaps 102 prior to bolting the side tubes 61 to the hinge brackets 64 and the side tube strut-linkage 63. Alternatively, the vertical flaps 102 could be provided with a zipper in a manner similar to the side tube zipper 94 provided for the support flap 100. Then the tubular support flaps 100 are wrapped around the side tubes 61, and finally, the side tube zippers 94 are zipped closed.

Figure 20:
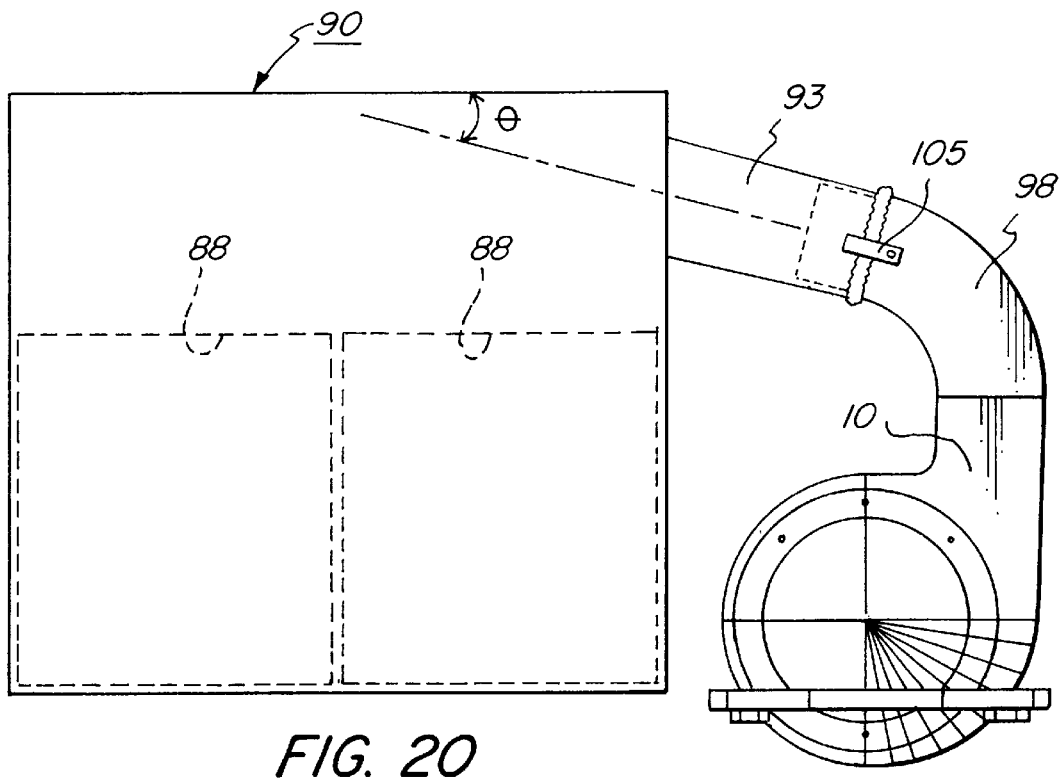
FIG. 20, a diagrammatic side elevation view of the fan housing, delivery duct and collector bag.

It will be noted from FIG. 20 that the inlet port 93 accommodates a delivery duct 98 which is associated with the fan housing 10. The inlet port 93 is comprised of an inlet port strap 105 which snaps to the outlet duct 98 in order to prevent the inlet port 93 from being blown off of the outlet duct 98. There are at least two inlet port straps 105, and preferably there are three.

The air stream from delivery duct 98 enters the collector bag 90 at an angle θ relative to the top panel mesh vent 92. The angle θ is preferably between 5 and 20 degrees in order to prevent the organic material from accumulating on the mesh vent 92.

Figure 2:
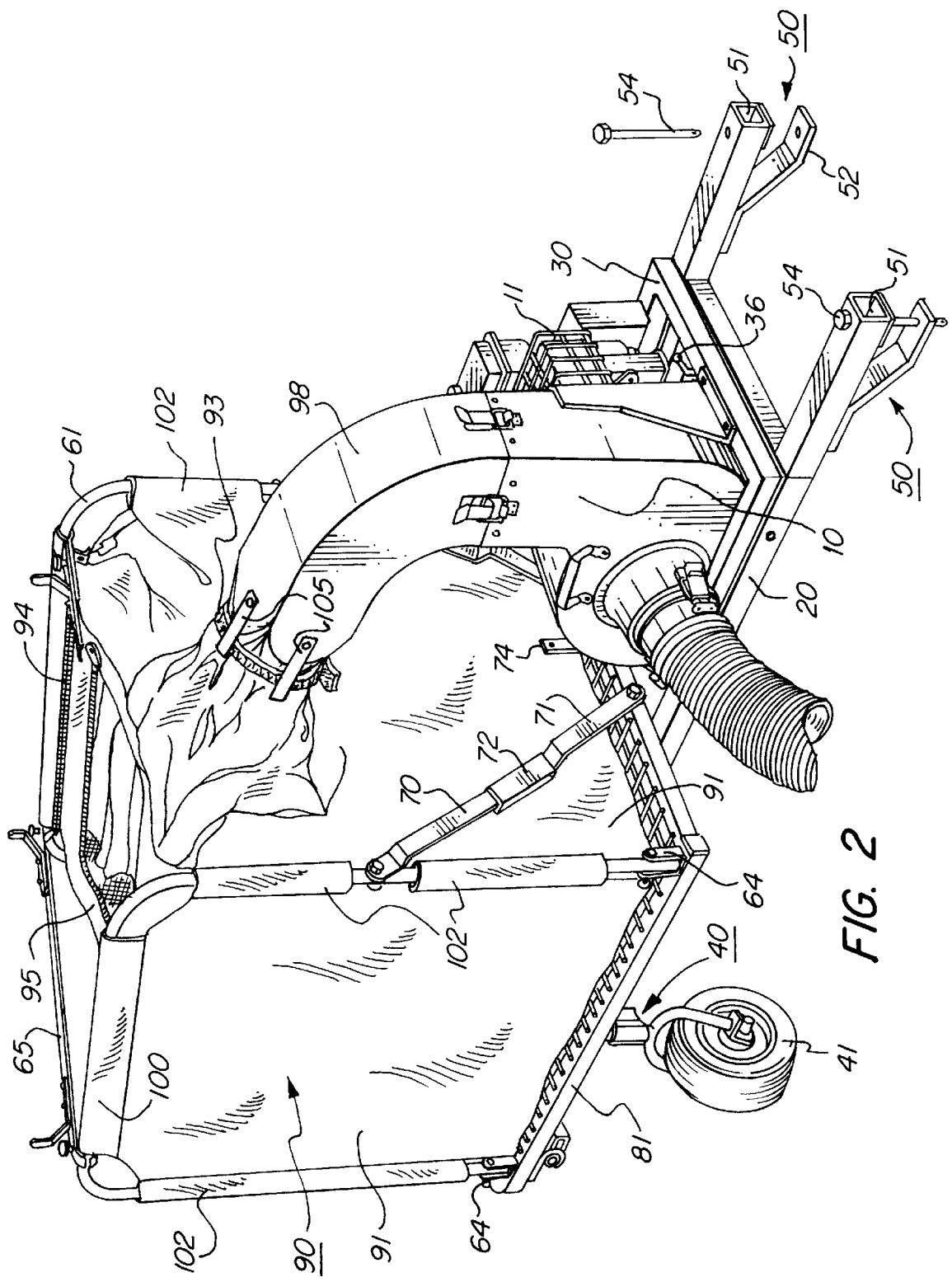
FIG. 2, a perspective view of the device of the present invention showing the relative positions of the collector frame, collector bag, fan motor, fan housing and trailer chassis.
Figure 3:
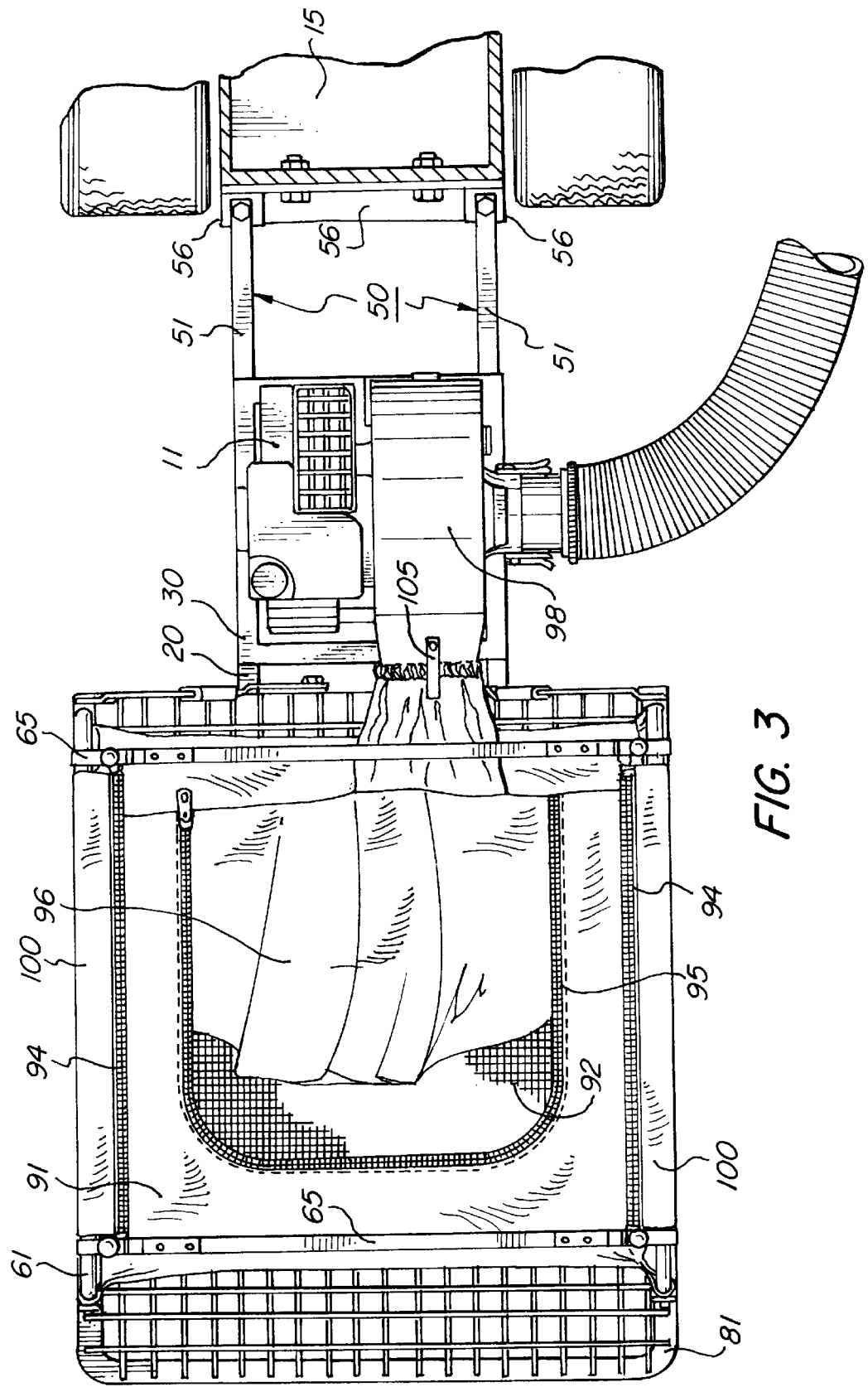
FIG. 3, a top view of the device according to the present invention.
Figure 29:
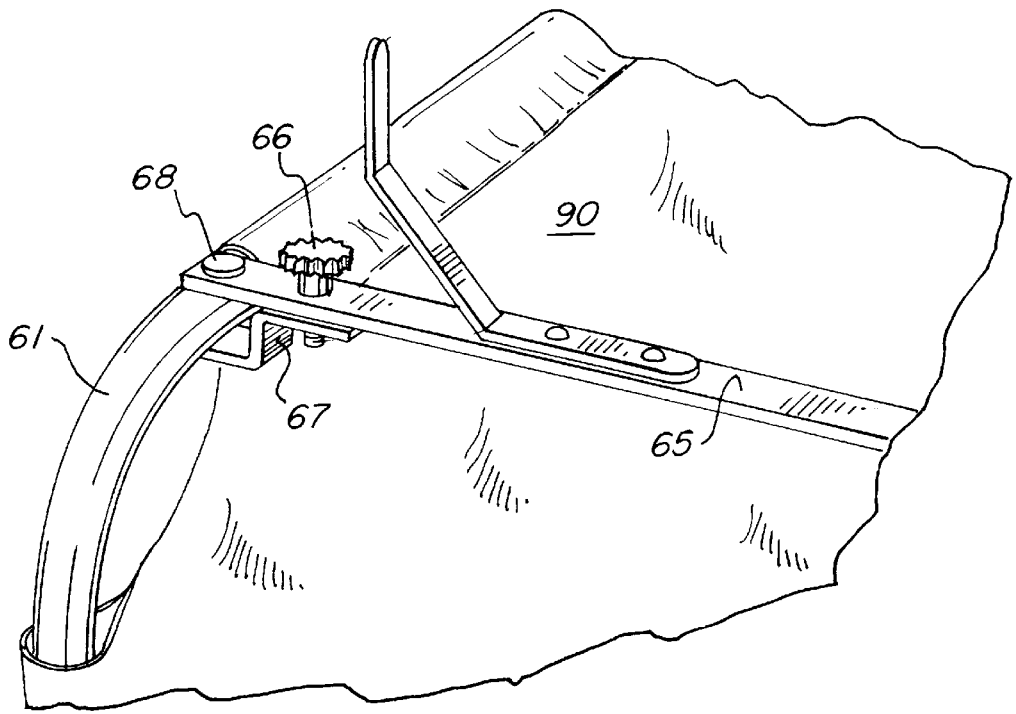
FIGS. 29 and 30 are perspective views of a carrier bar and a side tube.
Figure 30:
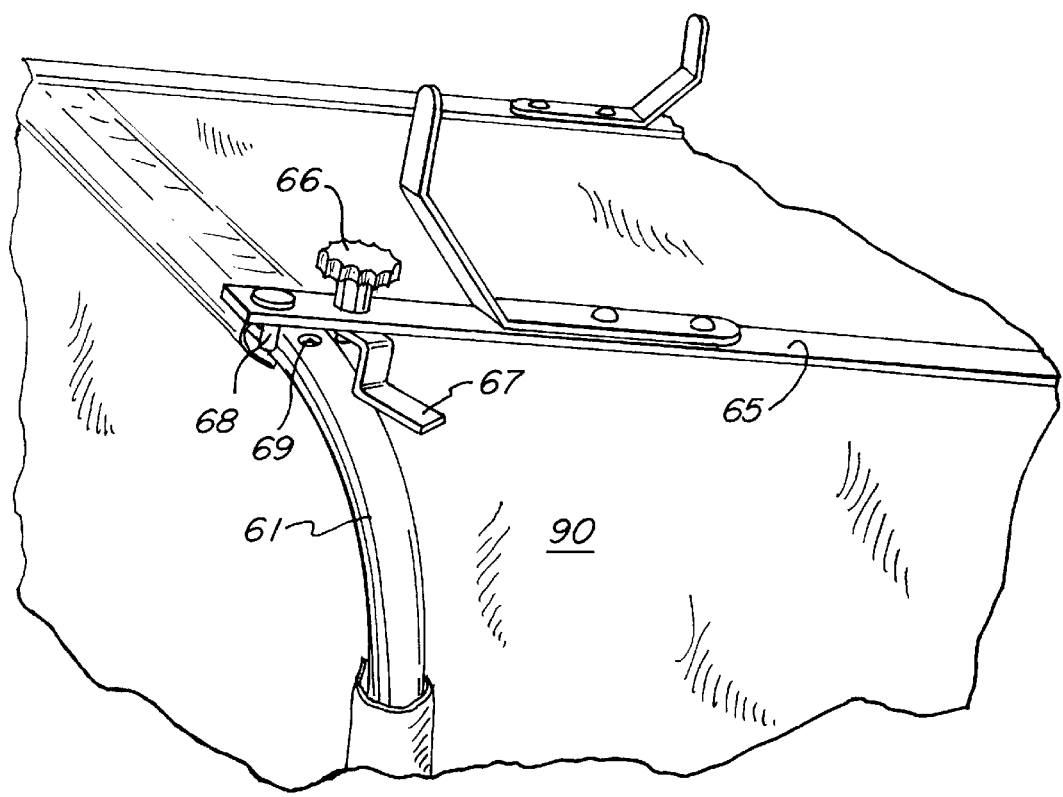
Figure 31:
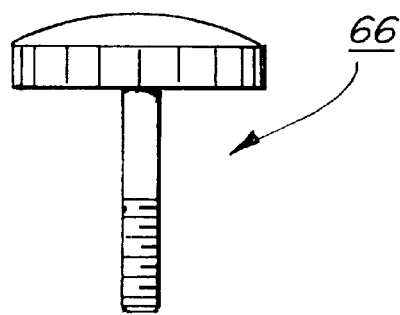
FIG. 31 is a front view of the threaded knob.

As shown in FIGS. 1, 2 and 3, the present invention may include transverse carrier bars 65, having their ends removably attached to side tubes 61, as shown in FIGS. 29 and 30. FIG. 29 shows a side tube 61 connected to a carrier bar 65. To remove the carrier bar 65 from the side tube 61, threaded knob 66 is twisted in order to loosen L-clamp 67 from side tube 61. Then, as shown in FIG. 30, carrier bar 65, having stud 68 therein, is lifted off the side tube 61 thereby removing stud 68 from the side tube hole 69.

The carrier bars 65 permit equipment, such as a long flexible tube (not shown), to be attached and carried. The carrier bars 65 also provide additional bracing of the collector frame 60. By using the carrier bars 65 to carry equipment, the equipment will be readily available to the user.

Figure 21:
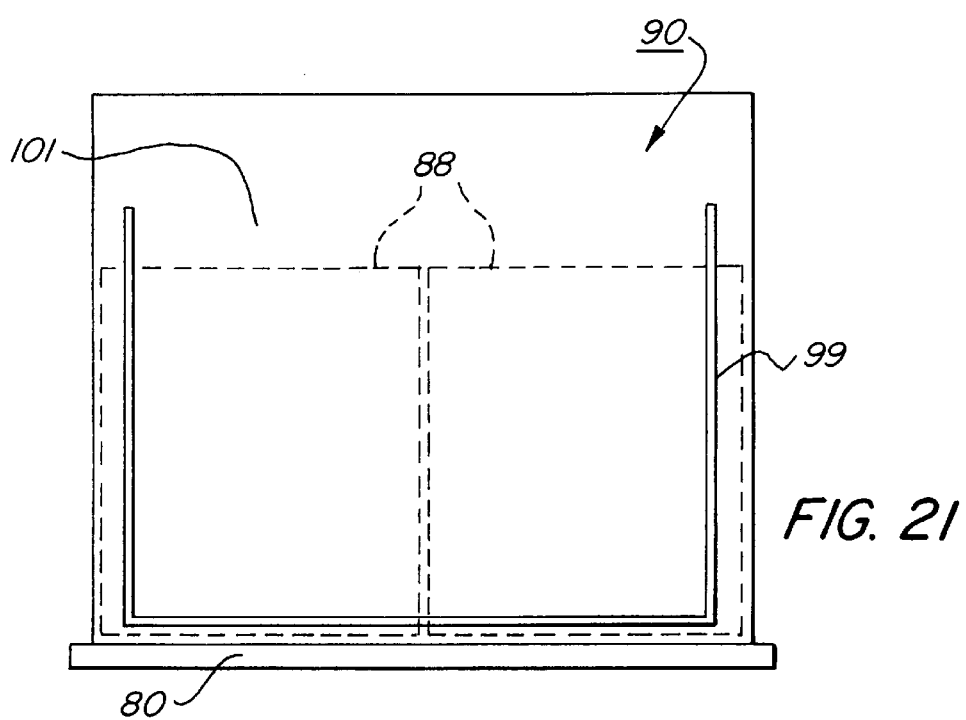
FIG. 21, a rear elevation view, which shows the collector bag, collector base and rear wall zipper.

As shown in FIGS. 23A–23D, removable bins 88 may be placed inside the collector bag 90. FIGS. 20 and 21 show the bins 88 (as dashed lines) inside the collector bag 90. The bins 88 catch the organic material and allow for easy transfer to a garbage bag for disposal. Alternatively, the bins 88 may be lined with garbage bags. The bins 88 are preferably made from corrugated polypropylene, the "living hinge" plastic, so that they are strong and yet also light weight, and therefore, easily removed from the collector bag 90. In addition, the bins 88 are preferably collapsible so that they occupy minimal space when not in use.

A preferred construction of a bin 88 is shown in FIGS. 23E through 23L, formed from a blank 85 of "corrugated"-type polypropylene panelling with surface skins joined by a large plurality of longitudinal partition webs defining parallel longitudinal passages between themselves, producing a strong, stiff, rigid panelling about 1/8" thick, readily slit and scorable to define fold lines between subpanels. Bins 88 are shaped as tall collapsible cartons, constructed like collapsible toteboxes for bulk mail or heavy metal workpieces in machine shops. Such tote-boxes are maintained erect by the weight of their cargo resting on infolded bottom flaps. Bins 88 must be maintained erect without such cargo weight until sufficient organic material has been collected to provide this cargo weight.

Figure 23A:
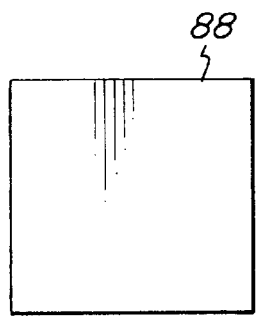
FIG. 23A, 23B, 23C and 23D, top, front, side and perspective views of a removable collector bin.
Figure 23D:
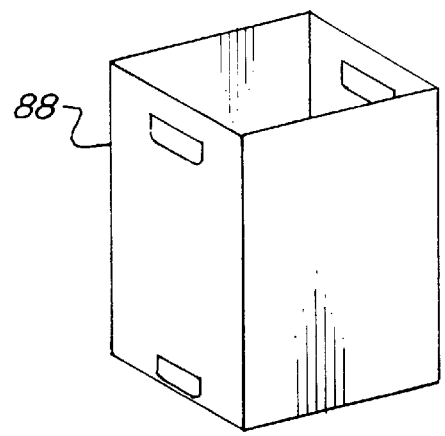
Figure 23B:
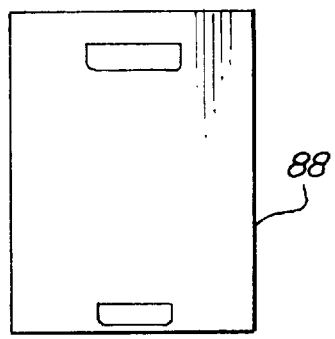
Figure 23C:
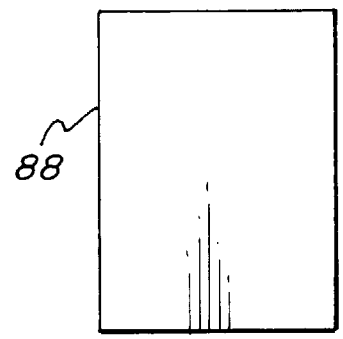
Figure 23E:
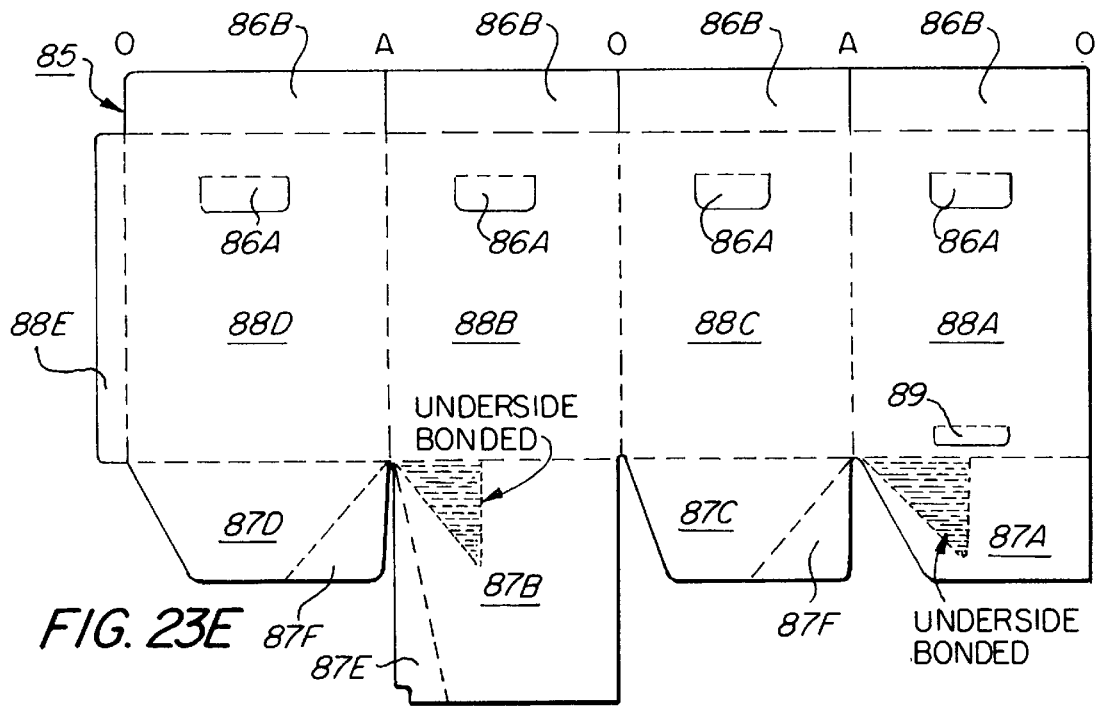
FIG. 23E is a top plan view and FIG. 23F is a lower end edge view of a blank of sheet material from which a collector bin is formed.
Figure 23F:
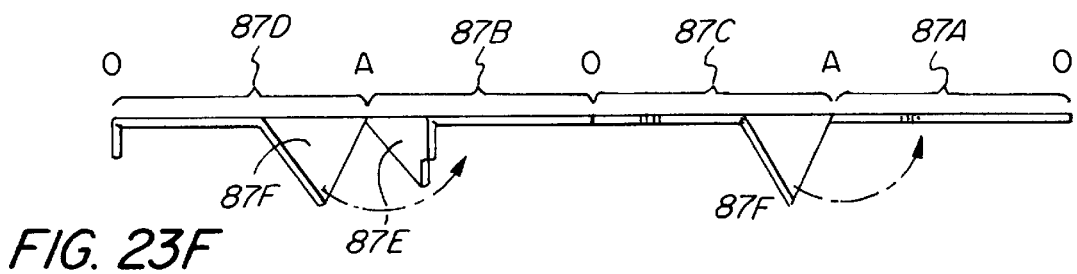

Blank 85 has its edges and five interior slits shown as solid lines in FIG. 23E. The front, rear and two side wall panels 88A, 88B, 88C and 88D of bin 88 are formed by the subpanels respectively bearing these reference numerals in FIG. 23E. This figure also shows a bonding flap 88E foldably extending from the long side free edge of side panel 88D for adhesive or heat sealing or other anchored fastening to the corresponding edge of front panel 88A at the opposite end of the blank, forming the four-sided collapsible box shown in the bottom views of FIGS. 23H, 23I and 23J. Handhold grip flanges 86A near the top edge of the major wall panels are scored for outward and upward folding, and the top edges of the major wall panels 88A–D are formed as rim flanges 86B scored for outward and downward folding, sandwiching a grip flange 86A between each rim flange 86B and its major wall panel, to which the rim flange is securely anchored by bonding, forming readily gripped upper lifting handle apertures for bin 88.

A preferred arrangement of folding bottom panels making each bin 88 collapsible (FIG. 23I) and also securely erectable (FIGS. 23D, 23K, 23L) is shown in these FIGURES. Two outer foldable half-width bottom panels 87C and 87D are foldably joined respectively to the lower edges of side wall panels 88C and 88D. A similar half-width bottom panel 87A is foldably joined to the lower edge of front wall panel 88A, and a substantially full-size square-shaped bottom panel 87B is foldably joined to the lower edge of rear panel 88B. The side edges of all bottom panels have triangular segments cut away to facilitate collapsible folding, as shown in FIG. 23E, and the full-size square shaped bottom panel 87B has a triangular segment 87E downfolded on a diagonal fold line along its side edge adjacent to bottom panel 87D, for the same purpose.

Figure 23K:
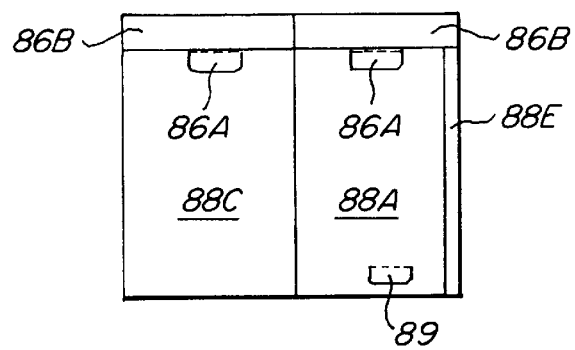

The side edges of bottom panels 87C and D opposite their cutaway sides are upfolded along 45° fold lines extending from their upper corners (FIG. 23E), forming bonding zones 87F (FIG. 23F) on their upper surfaces anchored by adhesive or heat bonding or fastenings to the undersides of adjacent bottom panels 87A and 87B when the bin 88 is erected in its rectangular parallelepiped shape shown in FIGS. 23D, 23K and 23J. In this condition, front bottom panel 87A is inserted between side bottom panel 87D and the substantially square rear bottom panel 87B to which 87D is bonded, and bonding flap 88E is then bonded to the free side edge of front panel 88A, completing the fabrication of the erectable bin 88.

As shown in the FIGURES, bonding tab 88E defines a sidewall corner of the bin 88 which defines an obtuse angle O during collapsing (FIGS. 23H and 23I), as does the opposite sidewall corner between side panel 88C and rear panel 88B. The bonding zones 87F joining overlapped bottom panels are positioned at the remaining corners, which form acute angles A during collapsing, and the bonded articulating bottom panels accommodate these acute angles, as shown in their foreshortened positions in FIGS. 23H and 23I. During erection of bin 88, the same bonding zones draw all bottom panels downward to form the square bottom shown in FIG. 23J.

In this erected condition, square-shaped rear bottom panel 87B forms the interior floor of bin 88, but the elastic memory of the "living hinge" polypropylene panelling tends to induce bin 88 to re-fold and collapse. This tendency is neatly counteracted by a small, inwardly-depressible latch tab 89 partially severed from the central lower portion of front sidewall 88A (FIGS. 23D, 23E, 23K and 23L). Following bin erection, tab 89 is pressed inward by the user to engage the upper surface of downfolded square-shaped bottom panel 87D, as clearly shown in FIG. 23L. Tab 89 and panel 87B are firmly held engaged by the panelling's elastic memory during use, until tab 89 is depressed outwardly by the user to permit collapsing of bin 88.

Figure 24:
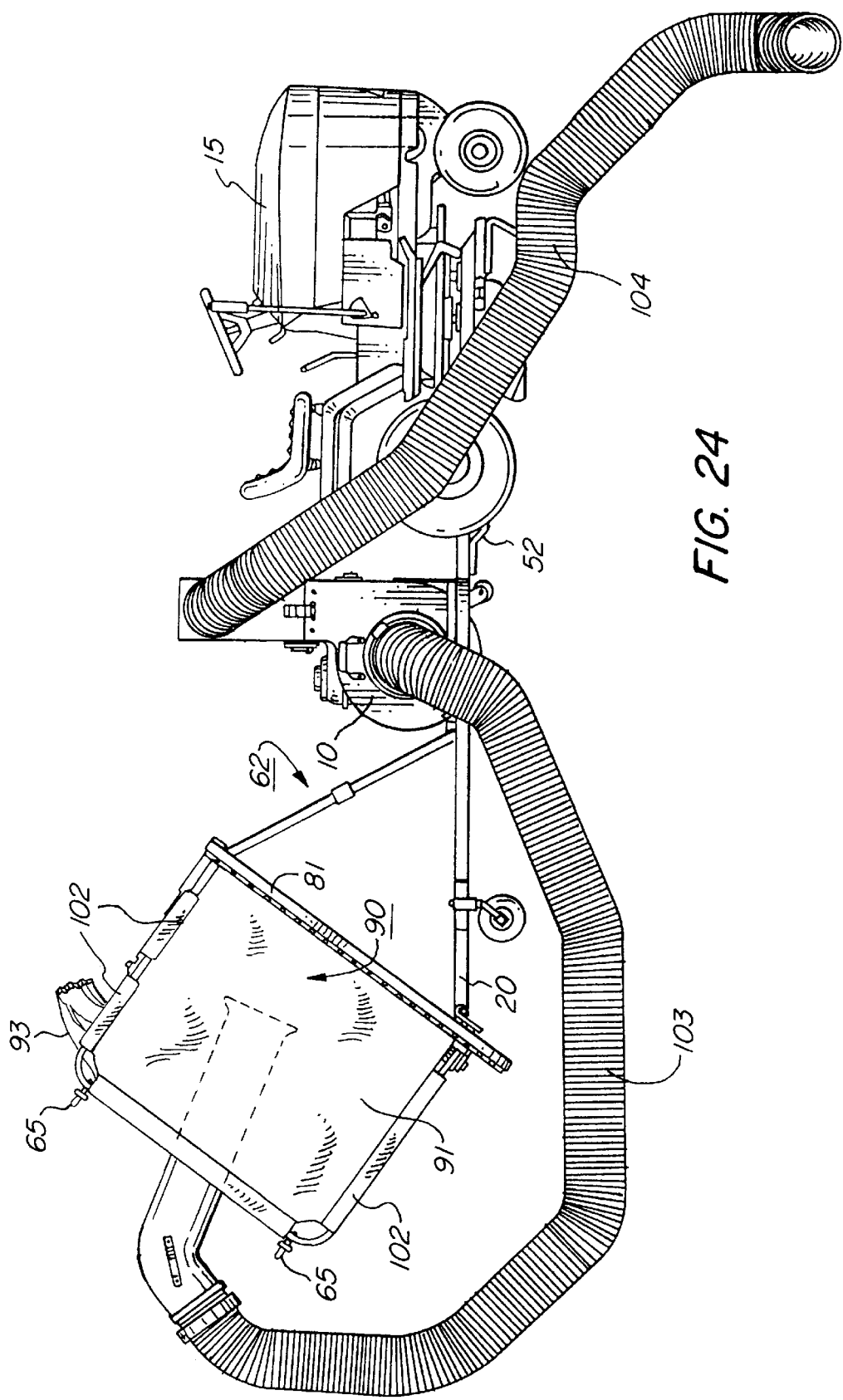
FIG. 24, a side view of the completed device arranged for unloading the collector bag.

The present invention readily lends itself to unload the collector bag 90 via the use of flexible tubing 103, 104 as shown in FIG. 24. In this manner of unloading the collector bag 90, flexible tubing 103 is positioned with one end extending through an access opening into the collector bag 90 and the other end connected to the inlet of fan housing 10. A second length of flexible tubing 104 is positioned with one end attached to the outlet of fan housing 10 and the other end at a location where it is desired to blow the contents of the collector bag 90. The flexible tubing 103, 104 is preferably comprised of reinforcing helical rib encased in a flexible transparent polymer. By arranging the present invention in this manner, the contents of the collector bag 90 can be blown to places where it would be difficult to place the collector bag 90 for unloading.

The invention described herein provides a device for collecting, mulching and transporting organic material which can be disassembled and stored in far less space than that occupied by the device when in use. Furthermore, since the trailer chassis 20 and collector frame 60 are made substantially from tubular material, these parts are lightweight and can be hung on a wall. In addition, the fact that the trailer chassis 20 and collector frame 60 are lightweight permits the use of the dual tongues 50 described herein to avoid the problem of jackknifing.

Conventional trailer construction employs sheet steel panel trailer walls and bed, supported by heavy gauge tubing or rolled steel channels, with a sheet steel collector enclosure, some weighing as much as several hundred pounds overall. The reduction in weight relative to the prior art achieved by the present invention permits easy maneuvering via the dual tongues 50 by relatively smaller tractors.

It will thus be seen that the objects set forth above, and those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An apparatus for collecting and transporting organic material comprising:
    a trailer chassis;
    a fan/motor mount removably connected to said trailer chassis;
    a motor driven fan, rotatably journalled in a fan housing having an organic material collecting inlet and an outlet stream portal anchored to said fan/motor mount;
    two laterally spaced tongues extending forward from said trailer chassis and adapted for connecting a tractor to said trailer chassis at two hitch points, laterally spaced apart for limiting the yaw of said trailer chassis with respect to the tractor;
    a peripheral collector frame detachably connected at its rear corners to said trailer chassis by hinge blocks extending laterally from the rear corners of the trailer chassis;
    a collapsible collector bag having a means for attaching said collector bag to said collector frame, an inlet port connectable to said outlet stream portal for delivering organic material to said collector bag from said fan housing, top vent means for allowing air to escape from said collector bag, and a rear access flap for selectively opening or closing said collector bag;
    at least two collector bag side supports hingedly connected to said collector frame so that said bag side supports can each be folded downwardly from an upstanding collector bag deploying position to a downfolded position depressing said collector bag into a collapsed condition juxtaposed to said collector frame when the apparatus is not in use;
    said means for attaching said collector bag including a first support flap for wrapping around one of said bag side supports and a second support flap for wrapping around a different one of said bag side supports;
    said collector frame being pivotable about said hinge blocks upward to a dumping position in order to dump the organic material from said collector bag once said access flap is opened, and
    at least one wheel assembly swivelingly attached to said trailer chassis for supporting said collector frame and for permitting the apparatus to move via the swiveling rotation of a wheel, whereby jackknifing of the trailer relative to the tractor is avoided.

2. The apparatus of claim 1 further comprising an unfolding hinged retractable strut dump linkage hingedly connected between said collector frame and said trailer chassis for extended unfolded deployment supporting said collector frame raised at a dumping angle relative to said trailer chassis for dumping the organic material from said collector bag, and for downfolding retraction permitting said collector frame to be lowered onto said chassis, said linkage having a slider holding the linkage in its extended unfolded deployment, said slider being slidable upward on said linkage for downfolding retraction.

3. The apparatus of claim 2 wherein said collector frame is provided with depending J-brackets each encircling the forward half of one of the hinge blocks, making the frame removable from said trailer chassis by rotating said collector frame through an angle greater than said dumping angle and lifting said collector frame upward off said trailer chassis.

4. The apparatus of claim 1 wherein said collector bag comprises non-breathable fabric panels, and said top vent means for allowing air to escape comprises a mesh vent and a fabric hood open to the rear and having a closed front edge and two closed side edges, positioned surmounting the mesh vent, deflecting air escaping through the mesh vent rearwardly, away from the tractor.

5. The apparatus of claim 4 further comprising a duct for carrying therethrough the organic material delivered through said outlet stream portal from said fan housing, to said collector bag wherein said duct enters said collector bag at an angle of between 5 and 20 degrees with respect to said mesh vent.

6. The apparatus of claim 1 wherein said collector bag further comprises base strap means for attaching said collector bag to said collector frame.

7. The apparatus of claim 6 further comprising a duct for carrying organic material therethrough to said collector bag wherein said duct enters said collector bag at an angle of between 5 and 20 degrees with respect to said top vent.

8. The apparatus of claim 7 wherein said collector bag further comprises a hood for deflecting rearwardly away from said tongues the air exiting said collector bag through said top vent means.

9. The apparatus of claim 1 wherein said trailer chassis is provided with at least two threaded fanmounting bores, and said fan/motor mount is clamped to said trailer chassis by at least two handled bolts each rotatable depending from said mount in alignment with one of said threaded bores, whereby said fan/motor mount is readily removable from said trailer chassis manually, without tools, for storage of said fan/motor mount, fan and motor apart from said trailer chassis.

10. The apparatus of claim 9 wherein said fan/motor mount further comprises 360°-swiveling casters for permitting said fan/motor mount to be rolled in any desired direction along a surface.

11. The apparatus of claim 1 wherein said apparatus further comprises a carrier bar spanning the space between and removably attached to said collector bag side supports in their upstanding position, for carrying and removably attaching accessory equipment to said carrier bar.

12. The apparatus of claim 1 wherein said collector bag side supports fold down one on top of the other, and further comprising an elastic strap for holding the topmost one of said down-folded collector bag side supports in juxtaposition to said collector frame, whereby said collector frame, collector bag and bag supports may be removed from said trailer chassis and stored in compact folded condition.

13. The apparatus of claim 1, further comprising a first flexible tube having two open ends, one of said ends being attached to said outlet stream portal of said fan housing, and the other of said ends being capable of directing organic material to a desired location.

14. The apparatus of claim 13, wherein:
said collector bag further comprises an upper zipper access opening; and
further comprising a second flexible tube, one end of which is attached to said collecting inlet of said fan housing, for removing organic material from said collector bag through an access opening.

15. The apparatus of claim 14 wherein said peripheral collector frame is spanned by a grid mesh of rods underlying the collector bag, and further including a plurality of base straps removably attaching the collector bag to the underlying rod grid mesh of the collector frame, whereby the collector bag is held in place on the grid mesh, resisting displacement when unloading the collector bag by connecting the fan inlet via said access flap or said upper access opening to the bag's interior by said second flexible tube.

16. The apparatus of claim 1, further comprising a tractor hitch bracket removably attached to the tractor and providing said two laterally spaced apart hitch points for loosely connecting said tongues thereto, and further including a vertically splayed yoke at the tractor end of each trailer tongue, each yoke being spanned by a clevis pin slidably linked for vertical and rocking movement relative to one said hitch point, thereby permitting said trailer chassis a limited amount of roll and pitch movement with respect to the tractor.

17. The apparatus of claim 1, wherein said collector frame comprises a grid mesh of rods for supporting said collector bag.

18. The apparatus of claim 1 further comprising a plurality of bins disposed within said collector bag for collecting said organic material, wherein said bins are foldably collapsible for storage and shipping and unfoldingly erectable for deployment within said collector bag, and wherein each said bin incorporates a bottom panel unfoldable downward to a cargo-carrying position, and an adjacent side wall having a latch tab inwardly depressible therefrom to engage and maintain said bottom panel in its cargo-carrying position.

19. The apparatus of claim 18, wherein said bins are comprised of polypropylene.

20. The apparatus of claim 18, wherein each collector bin is formed from a panel of corrugated polypropylene polymer.

21. The apparatus of claim 1, further including an upfolding hinged retractable side support strut linkage hingedly connected between said peripheral collector frame and one said side support for extended unfolded deployment supporting said side support in its upstanding collector bag deploying position, and for downfolding retraction permitting said side support to be lowered to its collapsed collector bag depressing condition, said strut linkage having a slider holding the linkage in its extended unfolded deployment, said slider being slidable upward on said linkage for downfolding retraction.

22. The apparatus of claim 21, further including one said side support strut linkage for each said collector bag side support hingedly connected to said collector frame.

* * * * *

UNITED STATES PATENT AND TRADEMARK OFFICE
CERTIFICATE OF CORRECTION

PATENT NO. : 6,029,312
DATED : Feb. 29, 2000
INVENTOR(S) : James C. Whitney

It is certified that error appears in the above-indentified patent and that said Letters Patent is hereby corrected as shown below:

In column 4, line 60, "lankges" should be --linkages--.

In column 6, line 53 "velcro" should be --Velcro--

In column 8, line 52 "87D" should be --87B--

In column 10, claim 2, line 1 "unfolding" should be --upfolding--

In column 10, claim 9, line 4 "rotatable" should be --rotatably--

Signed and Sealed this

Seventeenth Day of April, 2001

Attest:

NICHOLAS P. GODICI

Attesting Officer     Acting Director of the United States Patent and Trademark Office